United States Patent [19]
Ohtani et al.

[11] Patent Number: 6,084,692
[45] Date of Patent: Jul. 4, 2000

[54] IMAGE FORMING APPARATUS

[75] Inventors: Atsushi Ohtani, Inagi; Nobuyuki Hirai, Tokyo; Nobuyuki Bannai, Yokohama, all of Japan

[73] Assignee: Canon Kabushiki Kaisha, Tokyo, Japan

[21] Appl. No.: 08/951,561

[22] Filed: Oct. 16, 1997

[30] Foreign Application Priority Data

Oct. 17, 1996 [JP] Japan .................................. 8-274600

[51] Int. Cl.[7] .................................................. H04N 1/46
[52] U.S. Cl. ........................................ 358/509; 358/505
[58] Field of Search .................................. 358/509, 475, 358/505, 506, 474, 487, 468, 501, 401, 461; 382/312, 274; 355/32; 399/39, 220, 37, 177, 178, 51, 52; 250/234–236; H04N 1/46

[56] References Cited

U.S. PATENT DOCUMENTS

| 4,229,095 | 10/1980 | Mir ........................................... 358/505 |
| 4,378,568 | 3/1983 | Mir ........................................... 358/505 |
| 4,691,228 | 9/1987 | Nagano .................................... 358/509 |
| 4,935,787 | 6/1990 | Maeda et al. ............................. 399/39 |
| 4,970,585 | 11/1990 | Kurata ...................................... 358/509 |
| 5,430,282 | 7/1995 | Smith ....................................... 358/475 |
| 5,508,797 | 4/1996 | Tonai et al. ............................... 399/39 |
| 5,625,470 | 4/1997 | Ueta et al. ................................ 358/505 |
| 5,696,608 | 12/1997 | Matsuo et al. ............................ 358/475 |
| 5,717,790 | 2/1998 | Kanesaka et al. ........................ 382/274 |
| 5,719,686 | 2/1998 | Sakamoto et al. ....................... 358/501 |
| 5,737,095 | 4/1998 | Kikuchi et al. ........................... 358/475 |

*Primary Examiner*—Cheukfan Lee
*Attorney, Agent, or Firm*—Fitzpatrick, Cella, Harper & Scinto

[57] ABSTRACT

In an image forming apparatus, plural LED light sources are provided for emitting lights of respectively different wavelengths, and, in reading an illuminated image with a reading sensor, a lighting mode setting register selects a first mode for reading the image with a single color or a second mode for reading the image with plural colors. The light emitting time of these light sources are set by a light emitting time control register, a light emitting time counter and an automatic light emitting time adjustment circuit, and the currents supplied to the light sources are set by a lighting current control circuit. A CPU controls these circuits according to the selected mode.

63 Claims, 18 Drawing Sheets

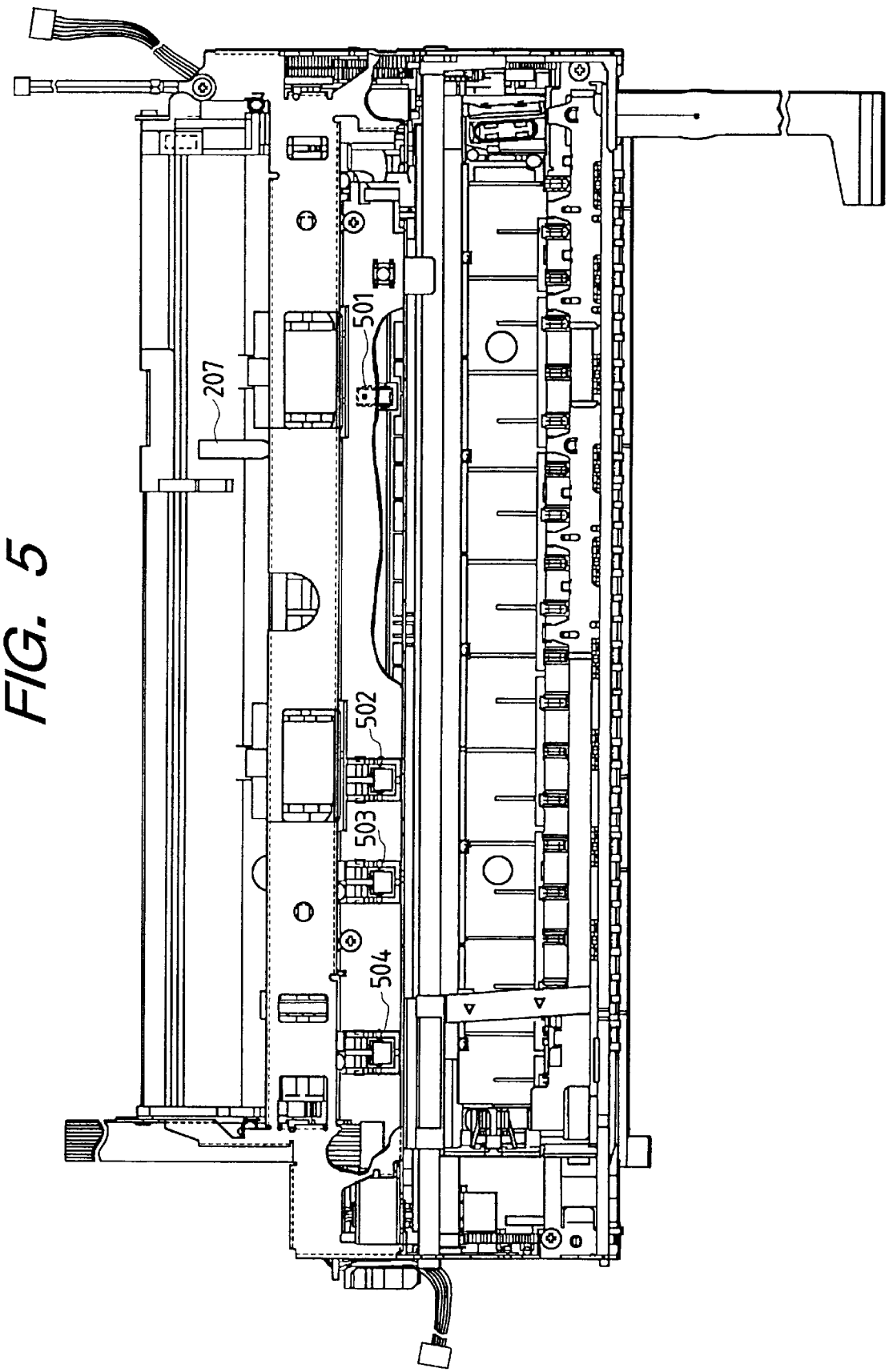

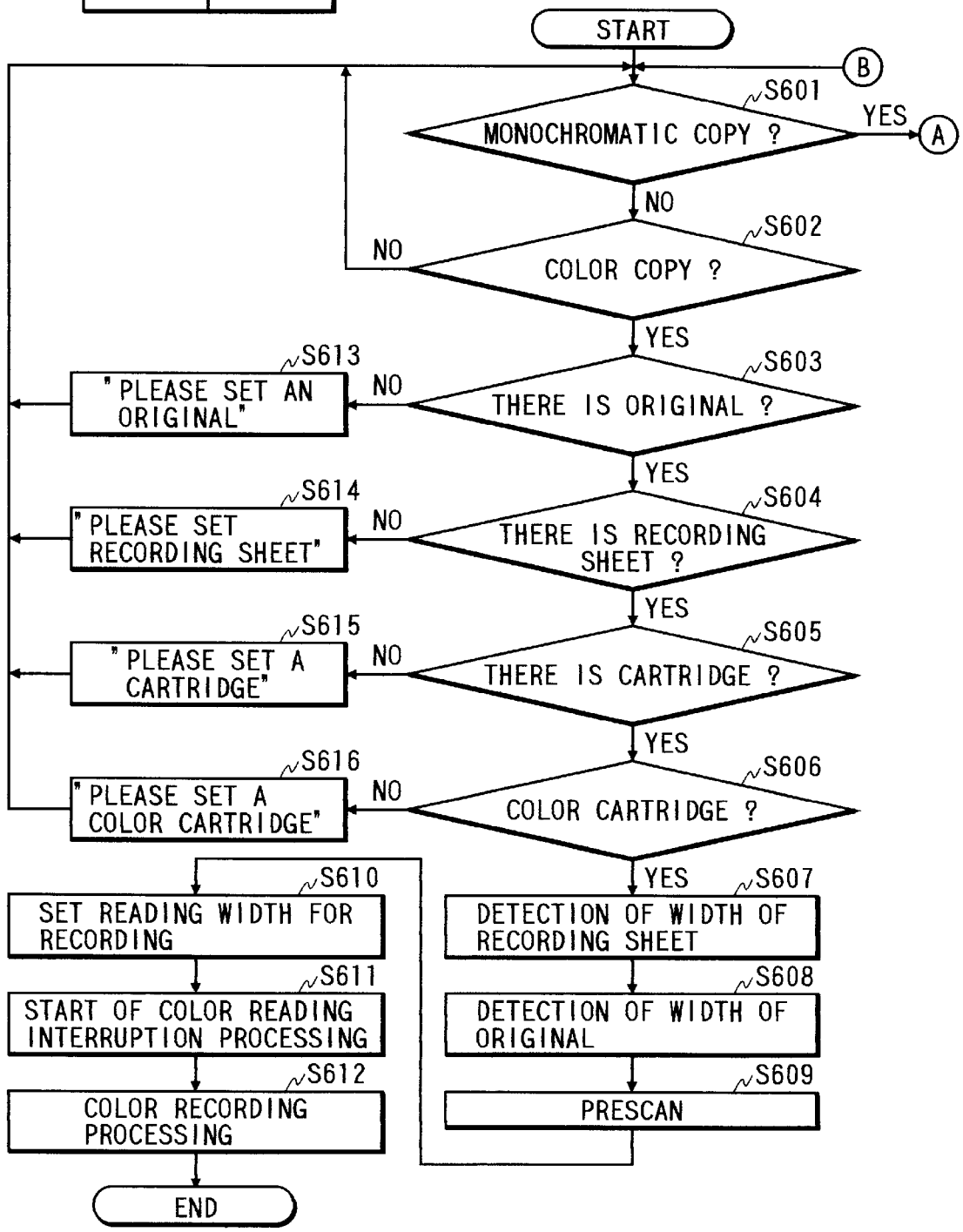

FIG. 11

READING PAPER SIZE IN COLOR COPY

| ORIGINAL DETECTION SIZE | 203dpi / 360dpi | RECORDING SHEET DETECTION SIZE ||||
|---|---|---|---|---|---|
| | | B4 | A4 | B5 | POSTAL CARD |
| | B4 | B4 | A4 | B5 | POSTAL CARD |
| | A4 | A4 | A4 | B5 | POSTAL CARD |
| | B5 | B5 | B5 | B5 | POSTAL CARD |
| | POSTAL CARD | | | | |

FIG. 15

READING PAPER SIZE IN MONOCHROMATIC COPY

| ORIGINAL DETECTION SIZE | RECORDING SHEET DETECTION SIZE | | | |
|---|---|---|---|---|
| | B4 | A4 | B5 | POSTAL CARD |
| B4 | B4 | A4<br>(B4→A4) | B5<br>(B4→B5) | POSTAL CARD |
| A4 | A4 | A4 | B5<br>(B4→B5) | POSTAL CARD |
| B5 | B5 | B5 | B5 | POSTAL CARD |
| POSTAL CARD | | | | POSTAL CARD | ature
IMAGE FORMING APPARATUS

BACKGROUND OF THE INVENTION

1. Field of the Invention

The present invention relates to an image forming apparatus such as a copying machine or a facsimile apparatus, capable of reading an image and executing a predetermined process thereon.

2. Related Background Art

Conventionally there is already known an image forming apparatus capable of image reading with a color scanner and outputting the read image as a color image or a monochromatic image. Such color scanner effects image reading by illuminating the original image with a white light source and reading the illuminated original image with red, green and blue sensors, or by switching the color of the light source.

However, in the above-mentioned conventional image forming apparatus, the image reading with the red (R), green (G) and blue (B) sensors has been associated with a drawback of requiring complex signal processing for effecting positional compensation of the image reading sensors, in order to exactly reproduce the read color image.

On the other hand, the system of switching the color of the light source does not require such positional compensation, but inevitably leads to a larger dimension of the apparatus because three fluorescent lamps of red, green and blue colors are required. Also the fluorescent lamps, requiring a certain time for the stabilization of the light emission, are inadequate for use in the image reading device of so-called sheet-through type, in which the image is read while the original is transported. Consequently such light source-switching system can only be used in the image reading device of so-called book-reading type in which the image is read while the original is fixed. Also in case the characteristics are different among different colors, it has been difficult to achieve fine adjustments for example of the lamp lighting time, since the fluorescent lamps require a certain time for stabilization as mentioned above.

SUMMARY OF THE INVENTION

An object of the present invention is to provide an image forming apparatus capable of image reading of high quality.

Another object of the present invention is to extend the lifetime of the light source employed in the image forming apparatus.

Still another object of the present invention is to reduce the electric power consumption of the image forming apparatus.

The above-mentioned objects can be attained, according to an embodiment of the present invention, by an image forming apparatus comprising plural light sources emitting lights of different wavelengths; reading means for reading an image illuminated by the light sources; mode switching means for selecting a first mode for reading the image in a single color with the reading means or a second mode for reading the image in plural colors; light emitting time setting means for setting the light emitting time of the light sources; electric power setting means for setting the amounts of electric power supply to the light sources; and control means for controlling the light emitting time setting means and the power setting means according to the mode selected by the mode switching means.

Such configuration allows to eliminated wasted lighting of the light sources, thereby extending the lifetime of the light sources and reducing the electric power consumption of the image forming apparatus. Also high quality image reading is made possible both in the monochromatic and color image reading, since the light emitting time of the light sources can be appropriately set according to the reading mode.

Still other objects of the present invention, and the features thereof, will become fully apparent from the following description, which is to be taken in conjunction with the attached drawings.

BRIEF DESCRIPTION OF THE DRAWINGS

FIG. 5 is a view showing the positional relationship between a recording sheet sensor 207 and a recording sheet size sensor 210 in the sheet feeding unit for the recording sheets;

FIG. 11 is a chart showing sizes read by the original size detection and the recording sheet size detection in case of color copying;

FIG. 15 is a chart showing sizes read by the original size detection and the recording sheet size detection and image size reducing methods in case of color copying;

DESCRIPTION OF THE PREFERRED EMBODIMENTS

Figure 1:
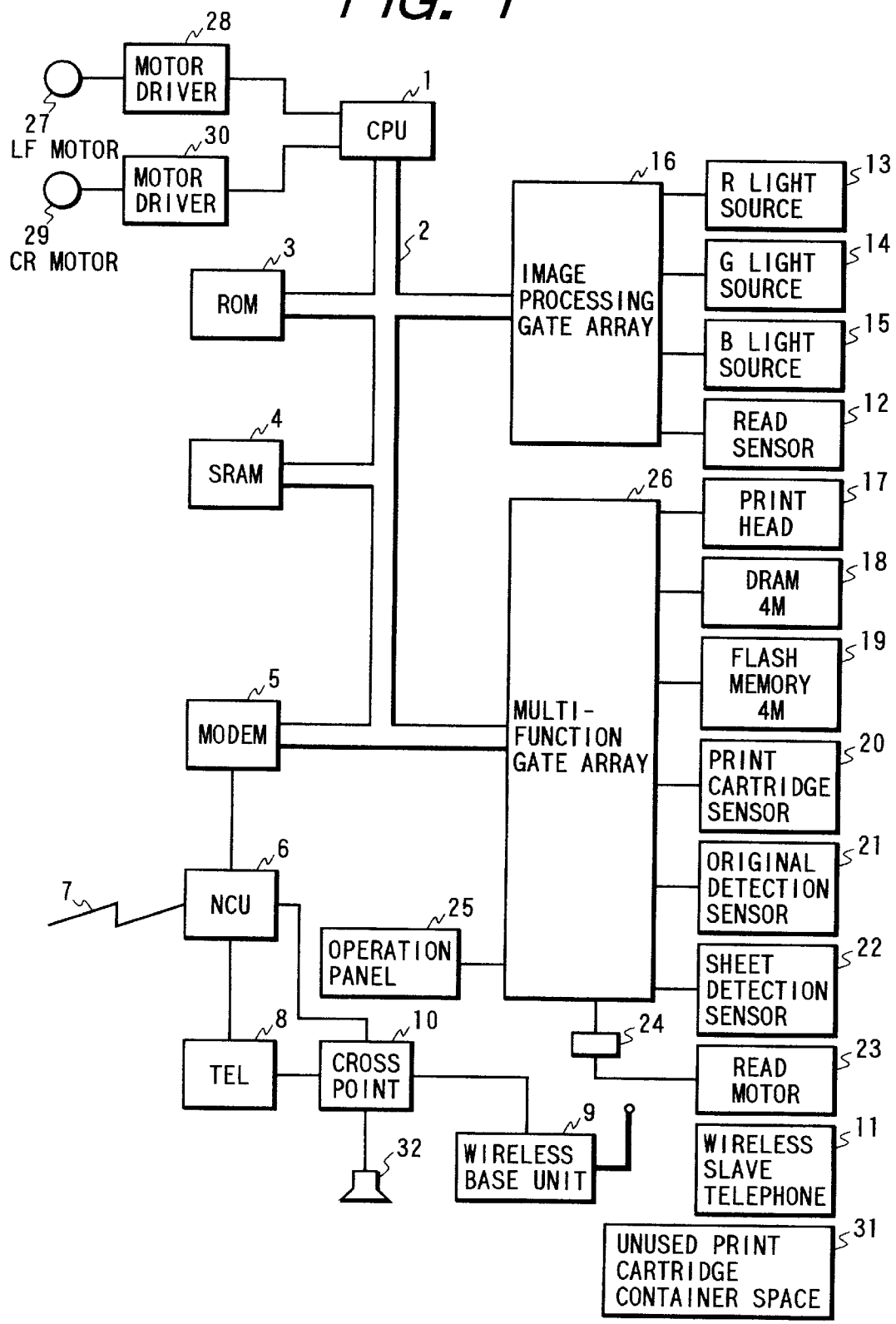
FIG. 1 is a block diagram of an image forming apparatus.

FIG. 1 is a block diagram of an image forming apparatus of a first embodiment according to the present invention.

Referring to FIG. 1, there are shown a CPU 1 for controlling the functions of the entire image forming apparatus; a bus 2 for exchanging data and commands; a ROM 3 storing a program to be executed by the CPU 1; an SRAM 4 for storing the transmitting source information and the user registration information; a modem 5 for modulating and demodulating the image signal and the voice signal; a network control unit (NCU) 6 for controlling the connection between a telephone line and the present apparatus; a public telephone line 7; a wired telephone unit 8; a base unit 9 of a wireless telephone unit; a cross point 10 for making selective connection between the telephone line 7 and the telephone unit 8 or the base unit 9 of the wireless telephone unit; and a wireless slave telephone unit 11.

There are also shown a reading sensor 12 consisting of a line sensor functioning as reading means for reading an image, and capable of reading the data of a line in the main scanning direction with 8 pel; a red LED light source 13 for illuminating the original; a similar green LED light source 14; and a blue LED light source 15. The LED's are employed as the light source not only because they enable compactization of the apparatus and are stabler in the light emission amount than the fluorescent lamps but also they have faster response characteristics, enabling high-speed switching of the light sources. Also the LED light sources, being lower in electric power consumption than the fluorescent lamps, can provide an image forming apparatus with low electric power consumption for home use.

An image processing gate array 16 is provided for effecting a shading correction process, a binarization process in case the image is monochromatically read or a gamma conversion process in case the image is read in colors, a resolution conversion process for converting the image data, read by the sensor 12, into the recording resolution of a recording head 17, and lighting control of the LED light sources. The image processing gate array 16 executes the above-mentioned processes under the control of the CPU 1 according to the program stored in the ROM 3.

The print head 17 is replaceable between a recording head for color image recording and a recording head for monochromatic image recording. The print head 17 employed in the present embodiment is composed of a recording head cartridge of ink jet type, wherein plural nozzles are arranged in the sub scanning direction of the sensor 12 to constitute a recording face and ink containing tanks are incorporated. At the recording operation, a carriage supporting such recording head is reciprocated in the main scanning direction, perpendicular to the direction of array of the nozzles, to form an image in an area of a recording width corresponding to such plural nozzles. An image is formed on the recording sheet by transporting the same by the recording width and repeating the recording operation.

In the foregoing description the recording head is assumed to be of ink jet type, but there may also be employed the recording head of other types, for example thermal transfer type. There are also provided a DRAM 18 for temporarily storing the image data to be supplied to the print head 17; a flash memory 19 for storing the received image or the telephone message; a print cartridge sensor 20 for detecting the presence and the kind of the print cartridge; an original sensor 21 for detecting the presence of the original and the width thereof; and a sheet sensor 22 for detecting the presence of the recording sheet and the size thereof.

There are further shown are a reading motor 23 for transporting the original; a motor driver 24 for driving the reading motor 23; and an operation panel 25 composed of a keyboard and an LCD for displaying the status of the image forming apparatus. On the keyboard there are provided, as explained later, a color copy key for instructing a color copying operation for reading and recording the original image in color, and a monochromatic copy key for instructing a monochromatic copying operation for reading and recording the original image monochromatic manner.

A multi-functional gate array 26 is connected to the image processing gate array 16, the modem 5, the print head 17, the DRAM 18, the flash memory 19, sensors 20, 21, 22, the motor driver 24 for the reading motor 23 and the operation panel 25. The multifunctional gate array 26 executes a process of converting the image data, arranged in the main scanning direction of the reading sensor 12, into image data in the sub scanning direction matching the nozzle arrangement of the print head and transferring thus converted data to the print head 17, a process of converting key input data from the operation panel 25 and output signals of the sensors into code signals readable by the CPU 1, and the timing control of the reading motor.

There are further provided an LF motor 27 for transporting the recording sheet in the sub scanning direction; a motor driver 28 for driving the motor 27; a CR motor 29 for driving the carriage supporting the print head; and a motor driver 30 for driving the CR motor 29. A space 31 for containing an unused print cartridge which is not yet mounted on the carriage may be provided in the apparatus, or may be provided in a separate container. A speaker 32 is provided for informing the user of the information for example on the status of the image forming apparatus by acoustic message.

Figure 2:
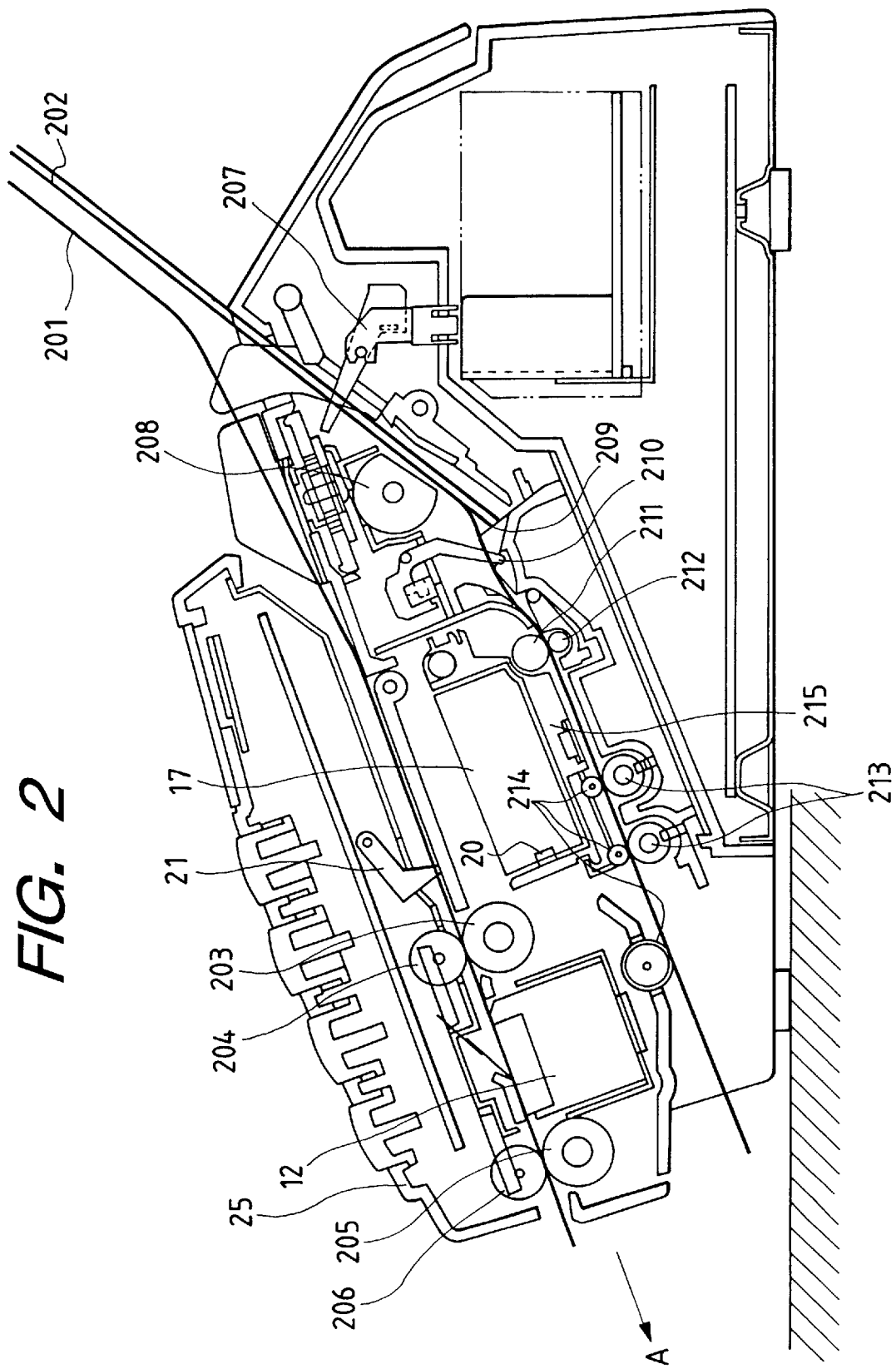
FIG. 2 is a cross-sectional view of the image forming apparatus.

FIG. 2 is a cross-sectional view of the image forming apparatus of the present embodiment, wherein components equivalent to those in FIG. 1 are represented by same numbers.

There are shown an original 201; a recording sheet 202; an original feeding roller 203 serving to feed the original 201 toward the image reading position and connected to the reading motor 23; an original feeding idler 204 to be rotated by the original feeding roller 203; and an original discharging roller 205 serving to discharge the read original and connected to the reading motor 23.

There are also shown an original discharging idler 206 to be rotated by the original discharging roller 205; a recording sheet sensor for detecting the presence of the recording sheet; a pick-up roller 208 for picking up the recording sheet; a separation member 209 for feeding the recording sheet one by one; and a recording sheet size sensor 210 for detecting the size of the recording sheet. In FIG. 1 and the accompanying description, the recording sheet sensor 207 and the recording sheet size sensor 210 are collectively described as the sheet sensor 22.

There are further shown an LF (line feed) roller 211 serving to transport the recording sheet in the sub scanning direction (indicated by an arrow A in FIG. 2) and connected to an LF motor 27; an LF idler 212 to be rotated by the LF roller; sheet discharge rollers 213 connected to the LF motor 27; and spurs 214 composed of water-repellent material in order to avoid smearing of the recording sheet upon passing over deposited wet ink.

The sensors 21, 207, 210 are constituted by actuators which are moved upon passing of the original or the recording sheet, and the presence/size of the original/recording sheet are detected by detecting such movements for example with optical sensors.

A carriage 215 detachably supports the recording head 17. On the carriage 215 there is provided a sensor 20 for detecting the presence/absence of the recording head 17 and the kind of the mounted recording head 17. The recording operation is executed by moving the carriage 215 with the motor 29.

Figure 3:
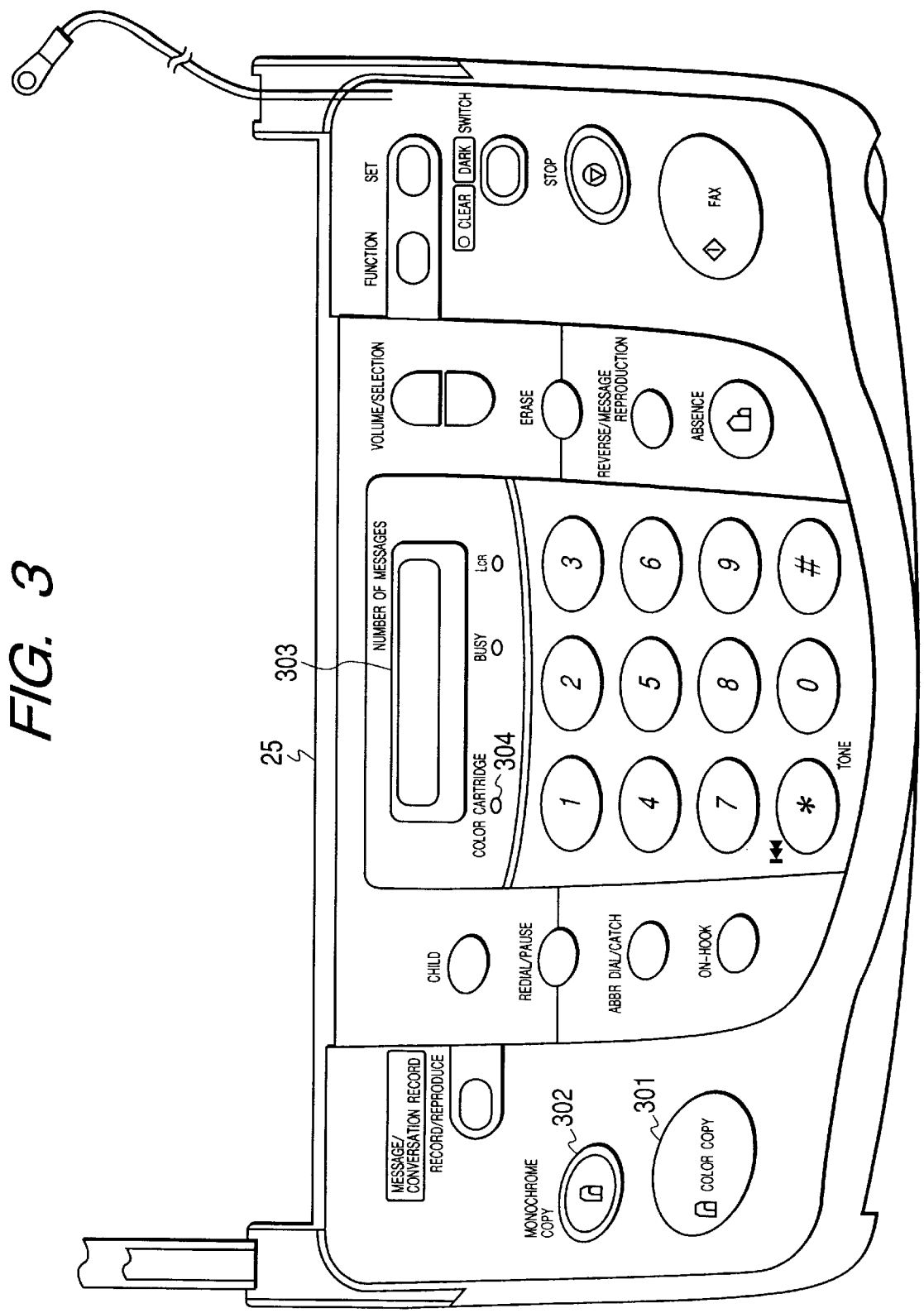
FIG. 3 is a detailed view of an operation panel 25.

FIG. 3 is a detailed view of the operation panel 25 of the image forming apparatus, wherein provided are a color copy key 301 for instructing a color copy operation for reading and recording the original image in color; and a monochromatic copy key 302 for instructing a monochromatic copy operation for reading and recording the original image in monochromatic manner. In this configuration, two keys are provided for selecting the color and monochromatic copy operations, but, in order to reduce the number of keys, the color and monochromatic copy operations may be alternately selected upon repeated depressions of a single key.

There are also provided an LCD (liquid crystal display) unit 303 for displaying the status of the apparatus or various information; and an LED indicator 304 to be turned on when a color cartridge is mounted.

Figure 4:
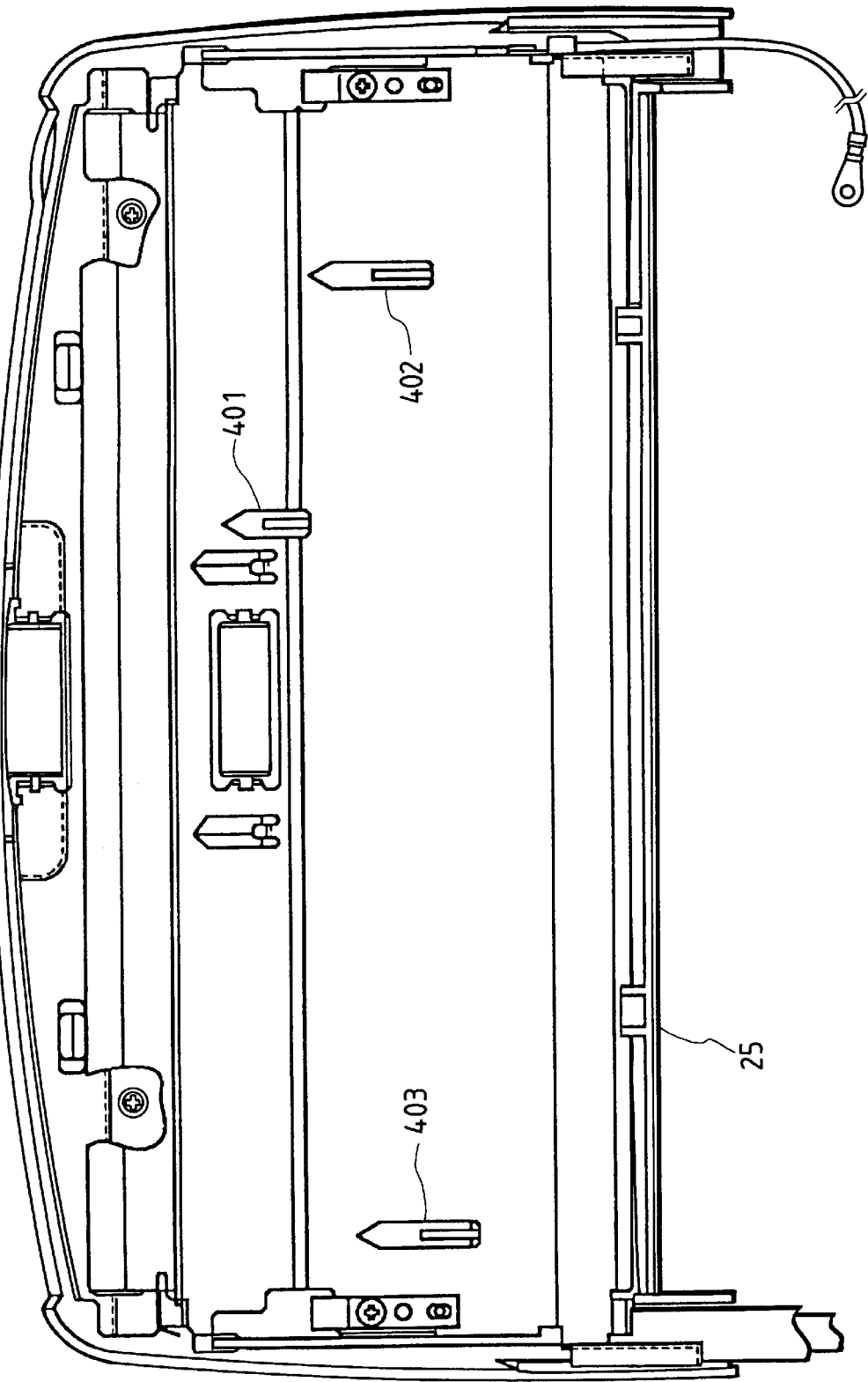
FIG. 4 is a rear-side view of the operation panel 25.

FIG. 4 is a rear-side view of the operation panel 25. In the following there will be given a detailed explanation on the original sensor 21. The original sensor 21 shown in FIG. 1 is composed of three sensors 401, 402, 403 each of which is provided with three signal lines connected to the multi-functional gate array 26. The sensor 401 detects the presence/absence of the original and the postcard size, while the sensor 402 detects the A4 size, and the sensor 403 detects the B4 size.

FIG. 5 is a view showing the feeding unit for the recording sheet, and the positional relationship of the recording sheet sensor 207 and the recording sheet size sensor 210 will be explained with reference to FIG. 5. The recording sheet is transported from the left-hand side to the right-hand side in FIG. 5. The recording sheet size sensor 210 shown in FIG. 1 is composed of four sensors 501, 502, 503, 504 from which four output signal lines are connected to the multi-functional gate array 26.

The sensor 501 detects that the recording sheet is of the postcard size, while the sensor 502 detects the B5 size of the recording sheet, the sensor 503 detects the A4 size of the recording sheet, and the sensor 504 detects the B4 size of the recording sheet.

Figure 6B:
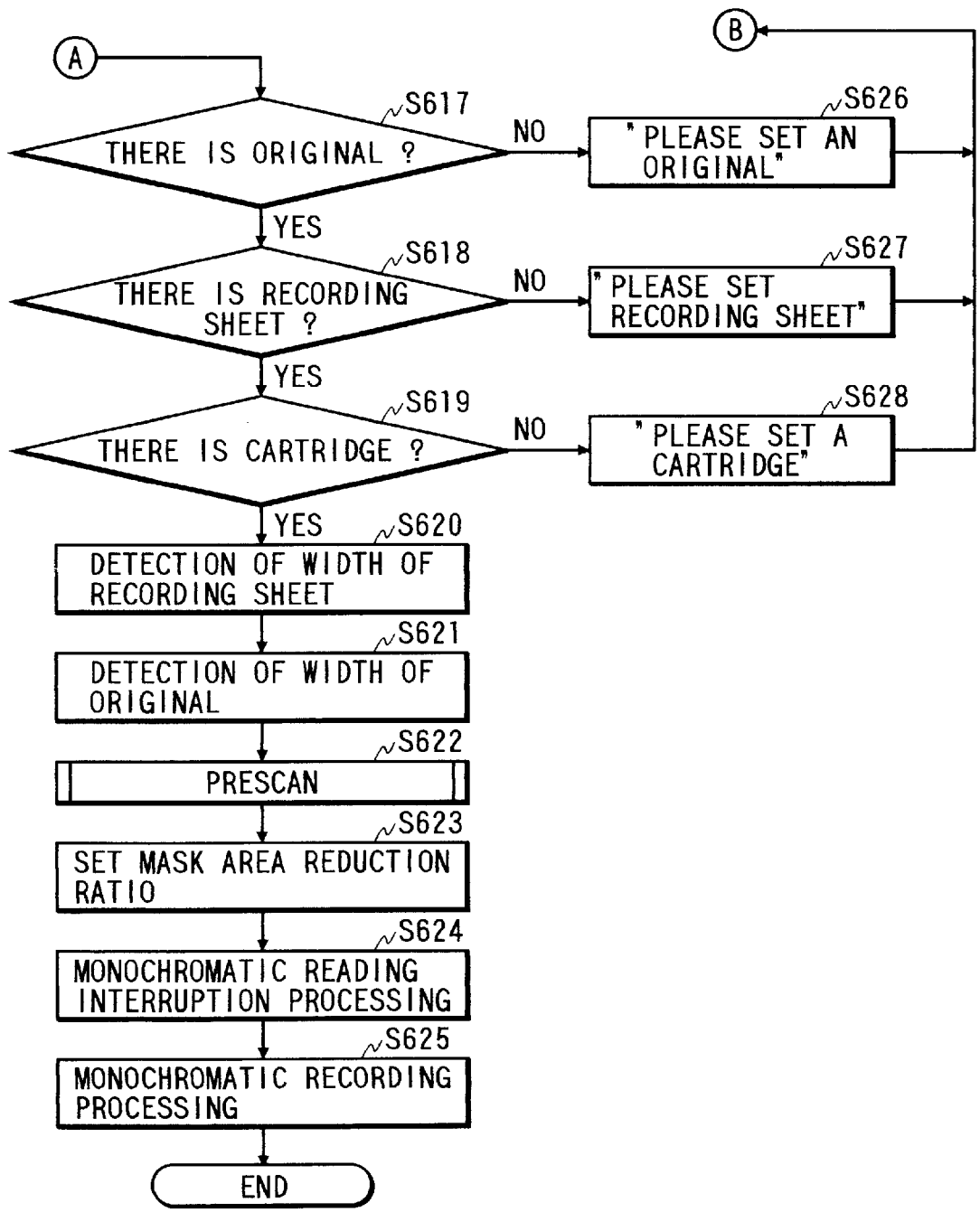
FIG. 6 comprising of FIG. 6A and FIG. 6B, is a flowchart showing the function of the apparatus.

Now reference is made to FIGS. 6A and 6B for explaining the function of the image forming apparatus. The CPU 1 executes the following operations according to the program stored in the ROM 3.

At first the CPU 1 discriminates whether the monochromatic copy key 302 of the operation panel 25 has been depressed (S601), and, if depressed, the sequence proceeds to a step S617. If not depressed, the sequence proceeds to a step S602 to discriminate whether the color copy key 301 of the operation panel 25 has been depressed. If the color copy key 301 has not been depressed, the sequence returns to the start, but, if depressed, the sequence proceeds to a step S603 in which the CPU 1 discriminates, by the output of the sensor 401 of the original sensor 21, whether an original has been set.

If the original has not been set, the CPU 1 in a step S613 displays a message, requesting the setting of the original, on the LCD 303 of the operation panel 25 and outputs a voice message of the same meaning by the speaker 32, and the sequence returns to the start. By such message the user can understand that the non-execution of the copying operation is caused by the absence of the original and can therefore take immediate action therefor. Also the user can take such action even when the display on the LCD is not clear, because the message is also given by voice.

In case the original is set, the sequence proceeds to a step S604, and the CPU 1 discriminates by the output of the recording sheet sensor 207, whether the recording sheet is present. If the recording sheet is not set, the CPU 1 in a step S614 displays a message, requesting the setting of the recording sheet, on the LCD 303 of the operation panel 25 and outputs a voice message of the same meaning by the speaker 32, and the sequence returns to the start. By such message the user can understand that the non-execution of the copying operation is caused by the absence of the recording sheet and can therefore take immediate action therefor. Also the user can take such action even when the display on the LCD is not clear, because the message is also given by voice.

In case the recording sheet is set, the CPU 1 in a step S605 discriminates, by the output of the print cartridge sensor 20, whether the print head 17 is mounted on the carriage. If the print head 17 is not set on the carriage, the CPU 1 in a step S616 displays a message "Set the cartridge", requesting the setting of the print head 17, on the LCD 303 of the operation panel 25 and outputs a voice message of the same meaning by the speaker 32, and the sequence returns to the start. By such message the user can understand that the non-execution of the copying operation is caused by the absence of the print head 17 and can therefore take immediate action therefor. Also the user can take such action even when the display on the LCD is not clear, because the message is also given by voice.

In case the print head 17 is mounted on the carriage, the CPU 1 discriminates in a step S606 whether a color cartridge is mounted on the carriage. If not mounted, the sequence proceeds to a step S616 in which the CPU 1 displays a message "Set color cartridge", requesting the setting of the color print head 17, on the LCD 303 of the operation panel 25 and outputs a voice message of the same meaning by the speaker 32, and the sequence returns to the step S601.

By such message the user can understand that the non-execution of the copying operation is caused by the absence of the color cartridge and can therefore take immediate action therefor. Also the user can take such action even when the display on the LCD is not clear, because the message is also given by voice. Also as the color copy operation is started after the discrimination of the kind of the cartridge, there can be avoided a situation where the color copy operation (reading and recording of the original image) is executed while the color cartridge is not mounted.

In case the color cartridge is mounted, the CPU 1 detects, in a step S607, the size of the recording sheet by the outputs of the recording sheet size sensors 501, 502, 503, 504, and, in a step S608, the width of the original by the outputs of the original sensors 401, 402, 403. After the detection of the width of the original, a step S609 executes a pre-scan operation, which will be explained later.

Figure 7:
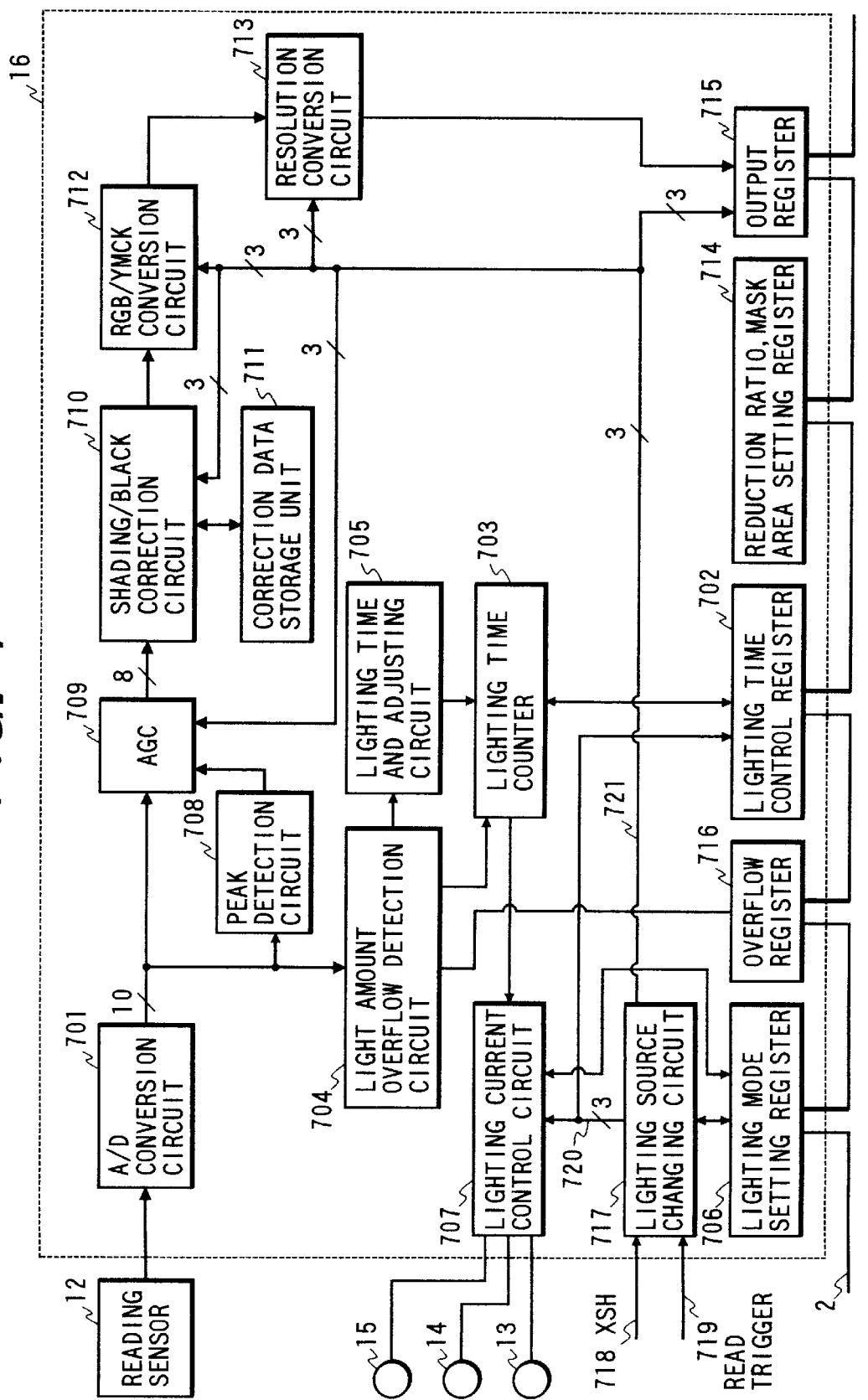
FIG. 7 is a detailed view of an image processing gate array 16.

After the pre-scan operation, a step S610 sets a reading width, recordable on the recording sheet, determined from the detected sizes of the recording sheet and the original, in a mask area/reduction ratio setting register 714 in an image processing gate array 16 and a work area in the DRAM 18 shown in FIG. 7. Then, in a step S611, the image processing gate array 16 executes a mask process for the areas outside the reading width and the conversion of the resolution in the main scanning direction, and the CPU 1 executes the conversion of the resolution in the sub scanning direction, based on the data in the DRAM 18. Among the image data read by the reading sensor 12, those in the areas not recordable on the recording sheet are eliminated by the mask process. After these processes, an image reading interruption process is activated to read the image by a main scan operation, and a step S612 records the read image in color mode on the recording sheet, whereupon the copy operation is terminated.

The image forming apparatus in the present embodiment can read an image area matching the size of the recording sheet, in case the original size is larger than the size of the recording sheet. If the copying operation is not conducted when the original size is different from the recording sheet size, the user has to acquire new recording sheets in main cases. The above-explained configuration of executing the image reading even when the original size is different from the recording sheet size enables the copying operation even when the recording sheets of various sizes are not available, as in the ordinary homes.

Also in the present embodiment, in case the recording sheet size is smaller than the original size, the image reduction matching the recording sheet size is not conducted. This is because, in case of a color image, the image size variation results in a significant deterioration of the image, and an increased precision in the image size variation leads to an increased cost.

In the following there will be explained the operations in case the step S601 identifies that the monochromatic copy key 302 has been depressed. In case the monochromatic copy key 302 has been depressed, the sequence proceeds to a step S617 in which the CPU 1 discriminates, by the output of the sensor 401 of the original sensor 21, whether the original has been set. If not, the CPU 1 in a step S616 displays a message, requesting the setting of the original, on the LCD 303 of the operation panel 25 and outputs a voice message of the same meaning by the speaker 32, and the sequence returns to the start. By such message the user can understand that the non-execution of the copying operation is caused by the absence of the original and can therefore take immediate action therefor. Also the user can take such action even when the display on the LCD is not clear, because the message is also given by voice.

In case the original is set, the CPU 1 in a step S618 discriminates, by the output of the recording sheet sensor 207, whether the recording sheet is present. If it is not set, the CPU 1 in a step S627 displays a message, requesting the setting of the recording sheet, on the LCD 303 of the operation panel 25 and outputs a voice message of the same meaning by the speaker 32, and the sequence returns to the start. By such message the user can understand that the non-execution of the copying operation is caused by the absence of the recording sheet and can therefore take immediate action therefor. Also the user can take such action even when the display on the LCD is not clear, because the message is also given by voice.

In case the recording sheet is set, the CPU 1 in a step S619 discriminates by the output of the print cartridge sensor 20 whether the print head 17 is mounted on the carriage. If not, the CPU 1 displays, in a step S628, a message "Set cartridge", requesting the setting of the print head 17, on the LCD 303 of the operation panel 25 and outputs a voice message of the same meaning by the speaker 32, and the sequence returns to the start. By such message the user can understand that the non-execution of the copying operation is caused by the absence of the print head 17 and can therefore take immediate action therefor. Also the user can take such action even when the display on the LCD is not clear, because the message is also given by voice.

In case the print head 17 is mounted on the carriage, the CPU 1 detects, in a step S620, the size of the recording sheet by the outputs of the recording sheet size sensors 501, 502, 503, 504, and, in a step S621, the width of the original by the outputs of the original sensors 401, 402, 403. After the detection of the width of the original, a step S622 executes a pre-scan operation, which will be explained later.

After the pre-scan operation, a step S623 sets an image reduction ratio so as to match the recording sheet size, determined from the detected sizes of the recording sheet and the original, in the mask area/reduction ratio setting register 714 in the image processing gate array 16 and the work area in the DRAM 18 shown in FIG. 7. The image processing gate array 16 executes a mask process for the areas outside the reading width in the main scanning direction and the conversion of the resolution according to the image reduction ratio, and the CPU 1 executes the conversion of the conversion of the resolution in the sub scanning direction, based on the data in the DRAM 18. After these processes, a step S624 executes a monochromatic image reading interruption process by a main scan operation, and a step S625 records the read image in monochromatic mode on the recording sheet, whereupon the copy operation is terminated.

FIG. 7 is a view showing the detailed configuration of the image processing gate array 16, wherein components equivalent to those in FIG. 1 will be represented by same numbers and will not be explained further.

There are provided an A/D converter 701 for converting the output of the reading sensor 12 into 10-bit digital signal; a lighting time control register 702 connected to a bus 2 and serving to set the lighting time of the LED light sources from the CPU 1; a lighting time counter 703 for controlling the lighting time of the LED light sources; a light amount overflow detecting circuit 704 for detecting whether the output of the A/D converter overflows by an excessive light amount; and a lighting time auto adjustment circuit 705 for automatic adjustment of the lighting time so as to avoid the overflow of the light amount of the LED light sources. Such lighting time control register 702, lighting time counter 703 and lighting time auto adjustment circuit 705 constitute lighting time setting means.

There are also provided a lighting mode setting register 706 for setting the current for controlling the light amount of the LED light sources, the lighting mode for controlling a light source switching circuit 717 and the light sources to be turned on each lighting mode; and a lighting current control circuit 707 for controlling the lighting current to be supplied to the LED light sources.

There are further provided a peak detection circuit 708 for detecting the peak value of the A/D converted image signal; an AGC circuit 709 for selecting an optimum 8-bit luminance range, based on the output of the peak detection circuit 708, within the luminance represented by the 10-bit digital signal released from the A/D converter 701; and a shading/black correction circuit 710 for effecting shading correction and black correction.

Further shown are a correction data storage unit 711 composed of a RAM, for storing the correction data obtained in the shading/black correction circuit 710 and effecting shading correction and black correction based on the stored correction data; an RGB/YMCK conversion circuit 712 for converting the image signal, corrected in the shading/black correction circuit 710 into Y (yellow), M (magenta), C (cyan) and K (black); and a resolution conversion circuit 713 for effecting a conversion of the image of a resolution of 8 pel in the main scanning direction, read by the reading sensor 12, into a printer resolution of 360 dpi, a size reduction of the read image and a masking of the unnecessary image.

There are further provided a reduction ratio/mask area setting register 714 for setting the masking area and the reduction ratio for the image from the CPU 1 through the bus 2; an overflow register 716 for enabling the CPU 1 to detect the overflow of the light amount; and a light source switching circuit 717 for switching the lighting time of the light sources on time-shared basis.

A clock signal 718 is provided for switching the lighting of the light sources by the light source switching circuit 717. In case of color image reading, the red, green and blue LED light sources are cyclically turned on by the clock pulses entered at an interval of 5 msec. In case of monochromatic image reading, the clock pulses are entered at an interval of 10 msec., and the green light source alone is turned on for a predetermined period. The switching of the color/monochromatic reading is set by the lighting mode setting register 706 constituting the mode switching means.

A reading trigger 719 is released by the CPU 1 in the unit of a line and activates the image processing gate array 16. Three signal lines 720 are provided from the light source switching circuit 717, in order to indicate the light source to be turned on among the red, green and blue ones. These signal lines 720 are connected to the lighting current control circuit 707 and the lighting time control register 702 and serve to execute the loading of the lighting times of the red, green and blue light sources into the lighting time counter 703 and select the light source to which the lighting current is to be supplied.

Also three signal lines 721, for effecting various processes based on the color of the activated light source, are connected to the AGC 709, the shading/black correction circuit 710, the RGB/CMYK conversion circuit 712, the resolution conversion circuit 713 and the output register 715. On the signal lines 721, a timing signal is supplied by the light source switching circuit 717 with a certain time delay from the timing signal on the signal lines 720, in order to effect various processes corresponding to the color of the light source turned on by the signal lines 720.

Figure 8:
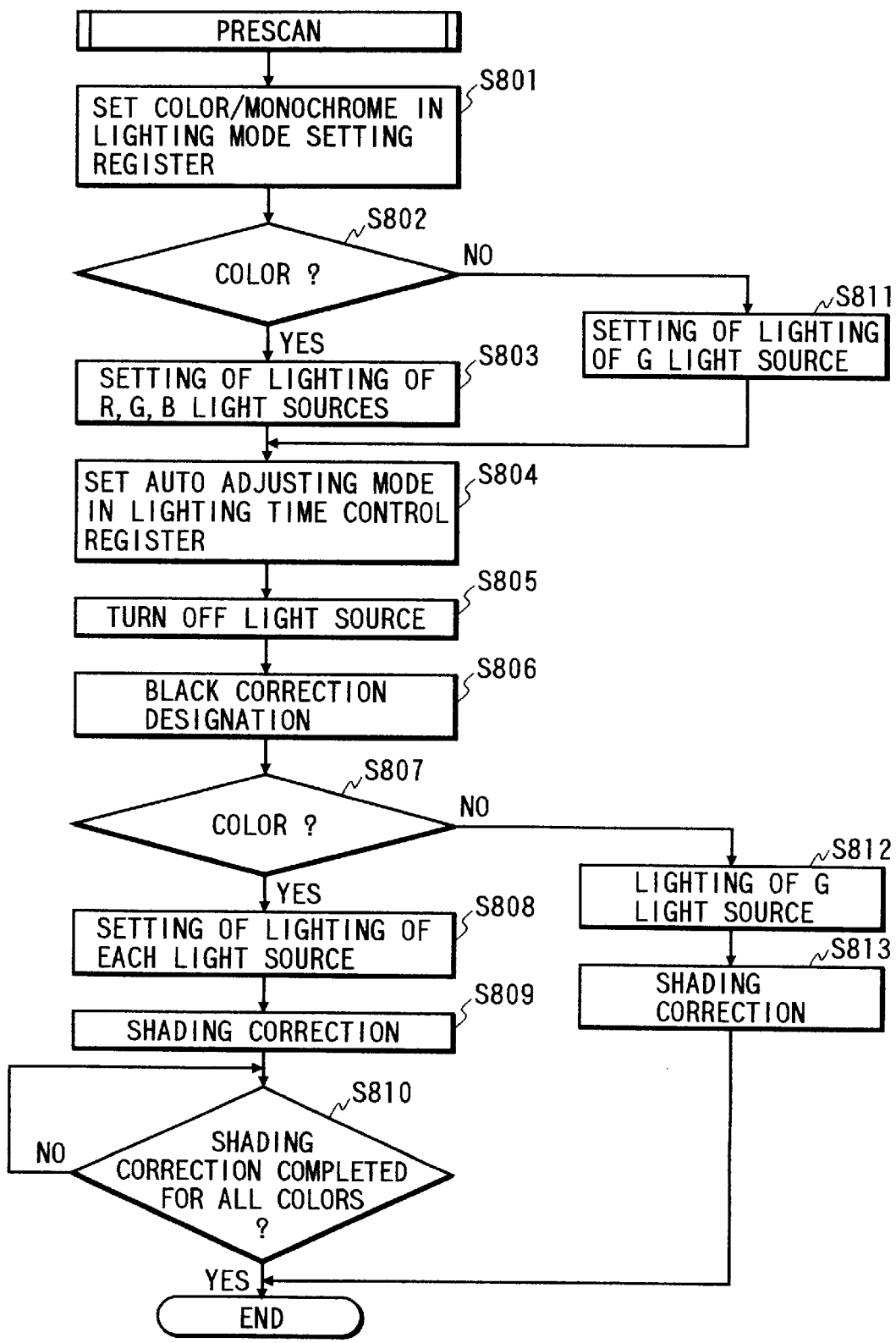
FIG. 8 is a flowchart of a pre-scan process.

In the following there will be explained the process executed by the image processing gate array 16 shown in FIG. 7, with reference to a flowchart shown in FIG. 8.

In the image forming apparatus of the present invention, when a pre-scan operation is instructed by the step S609 or S621 in FIGS. 6A and 6B, the CPU 1 executes a pre-scan operation in the following manner, according to the program stored in the ROM 3.

In case of color copy operation, a step S801 sets the color mode in the lighting mode setting register 706, and, according to such setting, a lighting current for the color mode is set in the lighting current control circuit 707 constituting the power setting means, and the time-shared switching of the light sources of three colors is set in the light source switching circuit 717.

In case of monochromatic copying operation, the current supplied to the LED light source can be made lower than that in the color copying mode, since the image reading is executed in 10 msec for each line so that the charge accumulation time can be selected longer than in the color copying mode. In the present configuration, the lighting current control circuit 707 supplies the LED light sources with a current which is a half of that in the color copying mode. The current is made lower than in the case of color copying mode, in order to reduce the deterioration of the LED light sources, resulting from the supply of a large current thereto. Also the maximum lighting time is selected as 5 msec, because such lighting time can secure a sufficient light amount even in case of monochromatic image reading with a speed of 10 msec per line.

Then a step S802 discriminates whether a color copying operation or a monochromatic copying operation is selected, and, in case of color copying operation, a step S803 sets the lighting mode setting register 706 so as to turn on the R, G and B light source, while, in case of monochromatic copying operation, a step S811 sets the lighting mode setting register 706 so as to turn on the G light source only.

Then a step S804 sets an automatic adjustment mode in the lighting time control register 702. In the image forming apparatus of the present embodiment, the color image is read in 20 msec per line while the monochromatic image is read in 10 msec per line. As the color image reading has to be made three times with the red, green and blue LED light sources, the reading time per the LED light source of each color (about 5–7 msec) becomes shorter than that of the monochromatic image reading.

For this reason, in order to secure a luminance level comparable to that in the monochromatic image reading, it is necessary to increase the current supplied to the LED light sources in comparison with the case of monochromatic image reading, thereby increasing the light amount. The level of such increase of the current in comparison with the case of monochromatic image reading is dependent on the current-luminance characteristics of the LED light sources. In the present embodiment, the lighting current control circuit 707 supplies the LED light sources with a current which is twice of the current supplied to the LED light sources in case of the monochromatic image reading. The lighting mode setting register 706 serves to control the current in the color image reading and in the monochromatic image reading.

After the necessary settings of the registers, the CPU 1 provides a trigger whereby the red LED light source 13 is at first turned on for the maximum lighting time (5 msec in this case). The maximum lighting time is counted by the lighting time counter 705, and, during the time set by this counter, the lighting current control circuit 707 releases an ON signal to send a current to the red light source 13 thereby turning on the same.

The light from the red light source illuminates an unrepresented white board, and the light reflected therefrom is received by the sensor 12. The received light is subjected to photoelectric conversion in the sensor 12, and is supplied as an analog electric signal to the A/D converter 701, which converts the entered analog electrical signal into 10-bit digital signal. The light amount overflow detection circuit 704 detects whether such digital signal shows an overflow. Upon detecting the overflow state of the light amount, the light amount overflow detection circuit 704 sends a trigger to the automatic lighting time adjustment circuit 705, which in response sets, in the lighting time counter 703, a value obtained by subtracting a predetermined time from the maximum lighting time (this value being 5 msec minus $\frac{1}{16}$ msec, in this case).

The LED light source is turned on again with thus newly set value and the overflow state of the light amount is detected. If the overflow state is still detected, the automatic lighting time adjustment circuit 705 newly sets, in the lighting time counter, a value obtained by subtracting the above-mentioned predetermined time from the lighting time set therein. This process is repeated while the overflow state is detected, and the initial value at which the overflow state becomes no longer detected is set, as the lighting time of the LED light source, in the lighting time register 702.

The set original is read, utilizing thus determined lighting time. The reading operation is similarly executed also for the green and blue LED light sources, by switching the light sources at an interval of 5 msec on time-shared basis. Also in case of monochromatic copy operation, the auto adjustment mode is set in the lighting time control register 702, then a step S811 effects setting so as to turn on the green light source only for the maximum lighting time (5 msec), and the lighting time is adjusted for this light source in a similar manner as in the color copy operation.

Figure 9:
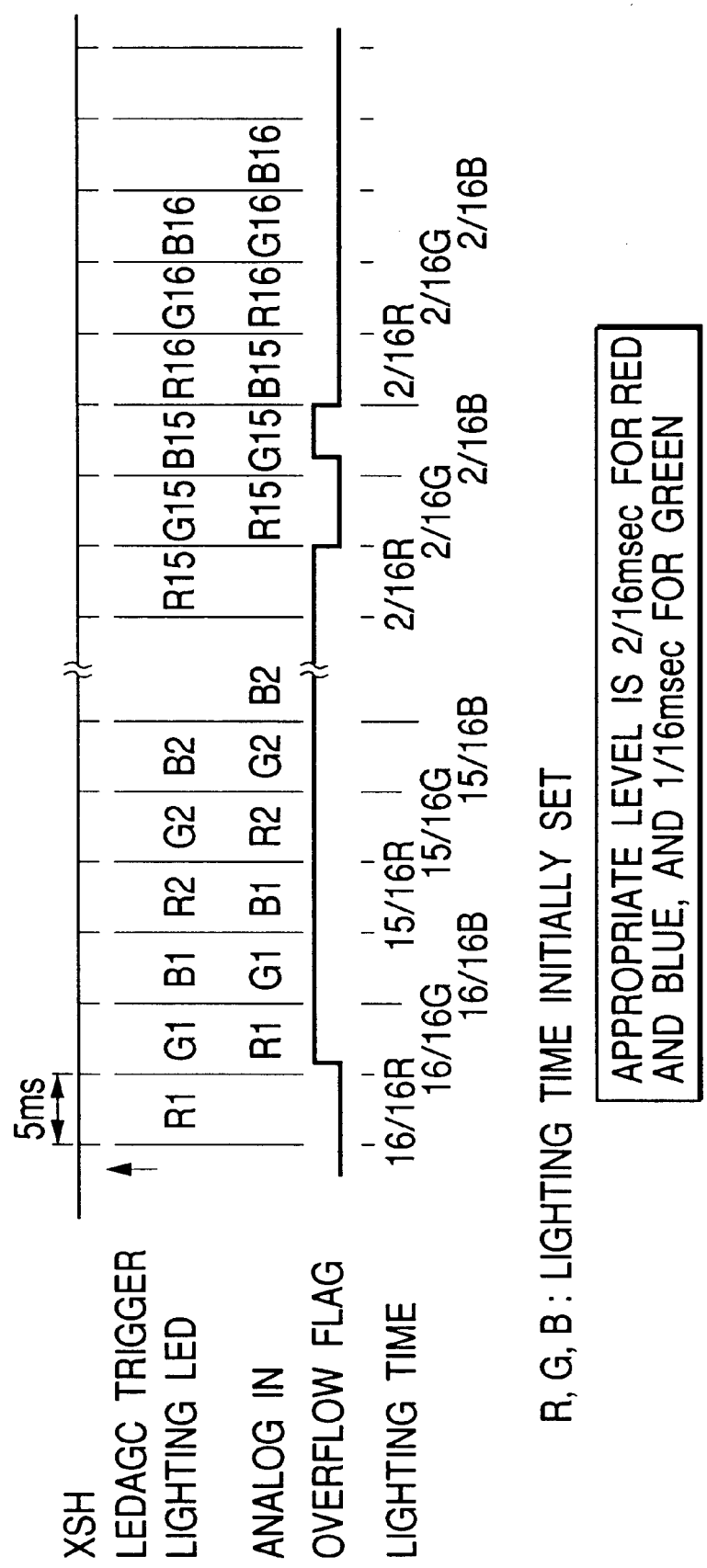
FIG. 9 is a timing chart of adjustment of the light source lighting time in case of color copying.

The adjustment of the lighting time of the light source in case of the color copy operation will be explained with reference to FIG. 9. The adjustment in case of monochromatic copy operation will not be explained as it is essentially same except that the green light source alone is lighted.

After the setting of the registers in the steps S801 and S803, a step S804 causes the lighting mode setting register 706 to send an LEDSGC trigger to the light source switching circuit 717, whereby the auto adjustment of the lighting time is initiated. A clock signal XSH is given to the light source switching circuit 717 at an interval of 5 msec. In response to the LEDAGC trigger, the light source switching circuit 717 cyclically turns on the LED's in the order of red, green and blue at each interval of 3XSH (5 msec). The image signal of each color read by thus turned-on light source is entered into the A/D converter 701 (ANALOG IN) with a delay of 1XSH from the activation of the light source.

In response to the LEDAGC trigger, the maximum lighting time (5 msec) is set for each color in the lighting time counter 703. The count for each color in the lighting time counter 703 is reduced by 1/16 of the maximum lighting time at every 3XSH (15 msec). In case an overflow state is detected by thus set lighting time, an overflow flag is set in the lighting time counter 703 and in the overflow register 716, after ANALOG IN, with a delay of about 1XSH from the setting of the lighting time. The lighting times of the respective colors are determined when the overflow states become no longer detected for the respective colors (2/16 msec for red and blue and 1/16 msec for green in the example shown in FIG. 9), and the lighting times showing no overflow are set, for the respective colors, in the lighting time control register.

The lighting times are adjusted for the respective colors because the LED's have different light emission characteristics for the different colors and, even for a same color, have fluctuations and time-dependent changes in the light emission characteristics, so that the image reading operation with the lighting times determined at the shipment from the factory may provide a deteriorated image by excessive or deficient light amounts.

After the adjustment of the lighting times of the light sources, the peak detection circuit 708 detects the peak value of the light amounts obtained with such lighting times. Based on the detected peak value, the AGC circuit 709 selects an optimum dynamic range of 8 bits among the 10-bit digital signal and sends the selected 8-bit digital signal to the shading/black correction circuit 710. Then, in a step S805, the CPU 1 turns off all the LED's, and the value read by the sensor 12 is entered into the AGC circuit 709 and the shading/black correction circuit 710.

Then, in a step S806, while all the light sources are turned off, the CPU 1 sends an instruction for black correction to the shading/black correction circuit 710. The black correction is to correct the fluctuation in the outputs of the pixels of the reading sensor 12. The obtained black correction data are stored in the correction data storage unit 711, and a step S807 discriminates whether a color copy operation has been instructed.

In case a color copy operation is instructed by the color copy key 301, the CPU 1 in a step S808 sets the kinds of the light sources to be turned on in the lighting mode setting register. Then, in a step S809, the image processing gate array 16 is given an instruction of executing the shading correction for the respective colors in time-shared basis, based on the lighting times of the light sources determined in the step S804. The shading/black correction circuit 710 executes shading correction by reading the light from the unrepresented white board and stores the correction data for the R, G and B colors in the correction data storage unit 711. A next step S810 discriminates whether the shading correction has been completed for all the colors, and, if not, the sequence awaits the completion of the shading correction, but, if completed, the pre-scan process is terminated.

In case a monochromatic copy operation is instructed in the step S807, a step S812 turns on the green light source with the lighting time determined in the step S804, and, in a step S813, the shading/black correction circuit executes shading correction by reading the light from the unrepresented light board and stores the correction data for the G light source in the correction data storage unit 711, whereupon the pre-scan process is terminated.

Figure 10:
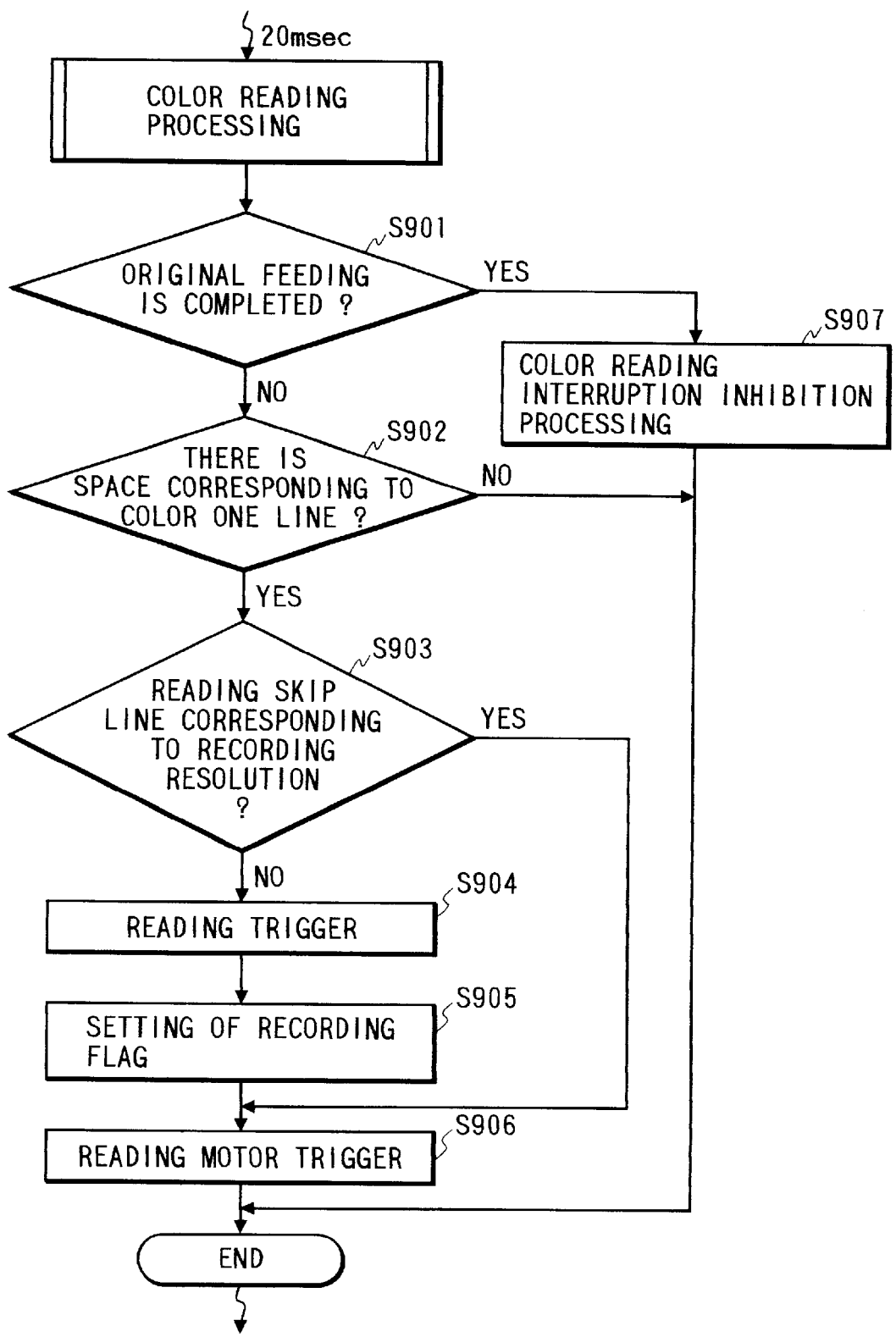
FIG. 10 is a flowchart of a color image reading process.

In the following a color reading task will be explained with reference to FIG. 10.

This interruption process is activated at an interval of 20 msec, in case the color reading process is activated in the step S611 shown in FIG. 6A. At first a step S901 discriminates whether the transportation of the original has been completed. If completed, a step S907 executes a process of inhibiting the present interruption process, whereby the present color reading interruption process is terminated. If the transportation of the original has not been completed, in a step S902, the CPU 1 discriminates whether the DRAM 18 has a vacancy of a line of the color image (a vacancy of 4 lines, corresponding to 1 line for each of YMCK image after RGB/YMCK conversion), and, if such vacancy is not available, the present interruption process is terminated.

If the vacancy of 1 line of the color image is available, there is executed the conversion of resolution in the sub scanning direction. In the sub scanning direction, since the recording resolution (360 dpi) is coarser than the reading resolution (15.4 pel or ca. 400 dpi), it is necessary to skip about 10% of the read lines. In a step S903, the CPU 1 discriminates whether the considered line is to be skipped in order to match the recording resolution, based on the data set in the DRAM 18 in the step S610 in FIG. 6A, and, if the considered line is identified not to be skipped, issues a reading trigger in a step S904.

In response to the reading trigger, the image processing gate array 16 reads the image by turning on the R, G and B LED light sources in succession with the lighting times determined in the above-explained prescan process. The read image is subjected, in the image processing gate array 16, to the image processing such as shading correction, black correction and RGB/YMCK conversion.

Then the resolution conversion circuit 713 executes the conversion of resolution in the main scanning direction, on the image with the reading resolution of 8 pel (about 200 dpi) into the resolution of 360 dpi recordable with the print head, and the masking process for the area which is not recordable on the recording sheet, in order to match the size of the recording sheet, based on the value set in the reduction ratio/mask area setting register 714.

FIG. 11 shows the image sizes to be recorded in various combinations of the original size and the recording sheet size. The image data of C (cyan), M (magenta), Y (yellow) and K (black), after the conversion of resolution in the resolution conversion circuit 713, are sent to the output register 715 and stored in the DRAM 18. Upon storage of the image data in the DRAM 18, a step S905 sets a recording flag in the work area of the DRAM 18.

After the setting of the recording flag, a step S906 issues a reading motor trigger to drive the reading motor, thereby feeding the original by a line, whereupon the color reading interruption process is terminated. In case the CPU 1 identifies, in the step S903, that the considered line is to be skipped in order to match the recording resolution, the sequence proceeds to a step S906 for issuing the reading motor trigger to drive the reading motor, thereby feeding the original by a line, whereupon the color reading interruption process is terminated. Such interruption process at the interval of 20 msec enables a reading operation with a speed of 20 msec per line. As the process speed per line for each color is about twice of that in the monochromatic image reading, the color reading speed is lower than the monochromatic reading speed. Consequently a color copy of high quality can be obtained with an inexpensive system, without overloading of the system.

Figure 12:
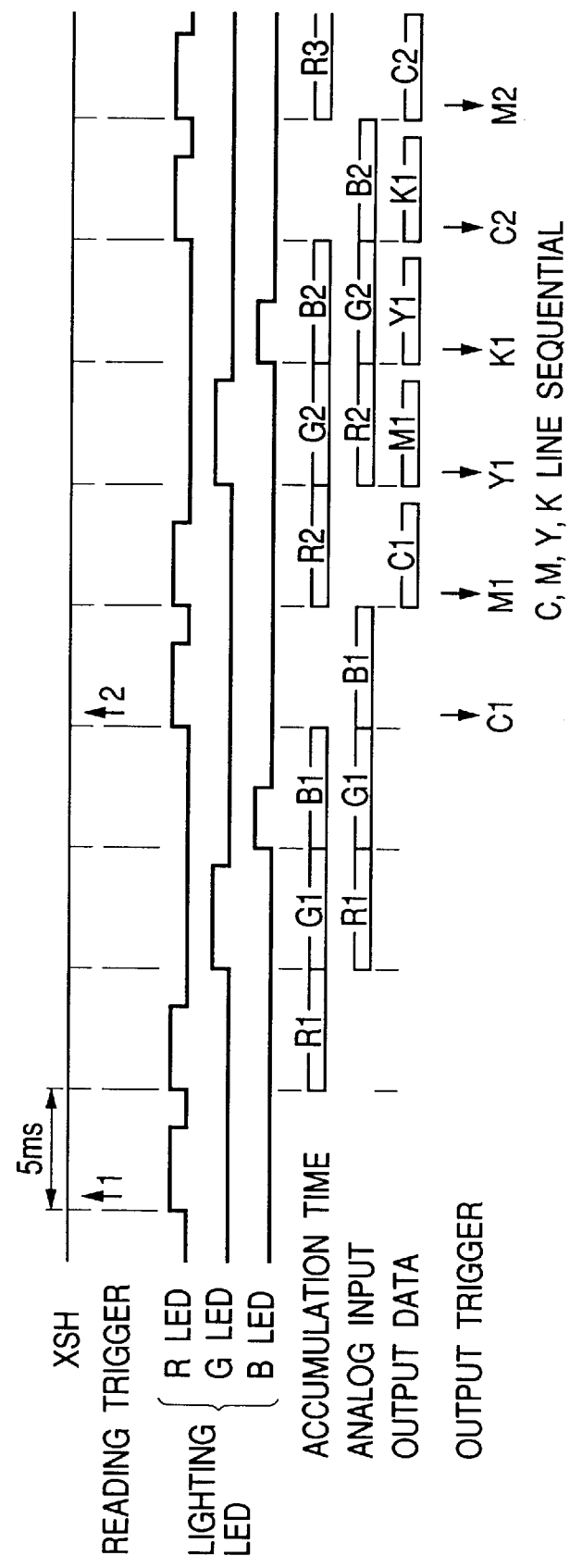
FIG. 12 is a timing chart for color image reading.

FIG. 12 is a timing chart in case of color image reading. The timing chart for monochromatic image reading is omitted. A clock signal XSH is supplied to the light source switching circuit 717 at an interval of 5 msec. When the step S904 sends a reading trigger to the light source switching circuit 717 through the signal line 719, the light source switching circuit 717 cyclically turns on the LED's in the order of red, green and blue at each interval of 1XSH (5 msec). The image signal of each color read by thus turned-on light source is entered into the A/D converter 701 (ANALOG INPUT) with a delay of 1XSH from the activation of the light source. Also in response to the reading trigger, the lighting times for the respective colors, determined in the pre-scan process, are set in the lighting time counter at the interval of 1XSH. The light sources are turned on in succession on the time-shared basis for each line, according to thus set lighting times. The obtained YMCK data are released with a delay of 1XSH (5 msec) from the ANALOG INPUT.

Figure 13:
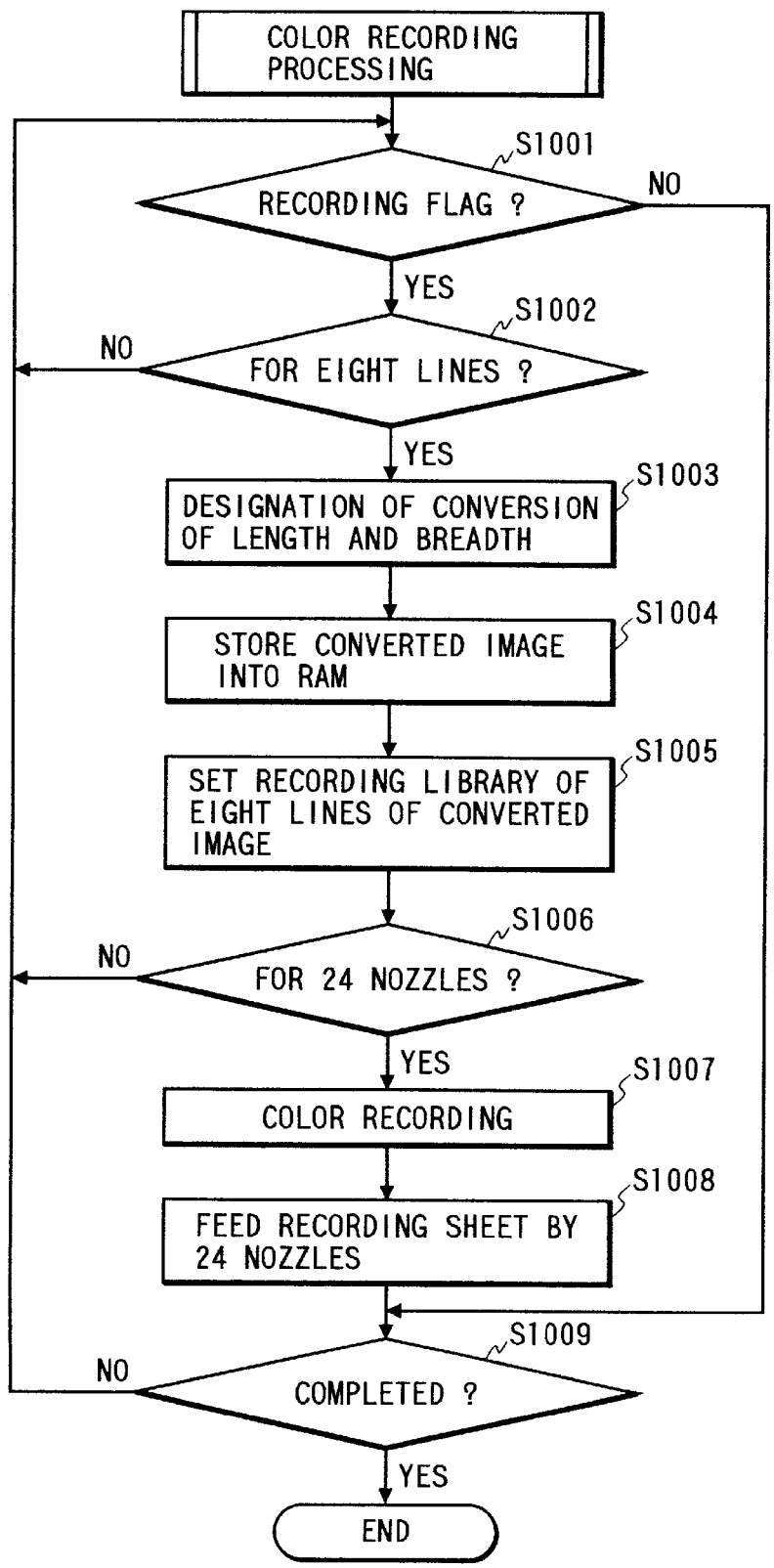
FIG. 13 is a flowchart of a color recording process.

In the following there will be explained, with reference to FIG. 13, a color recording task, which is activated by the step S612 in FIG. 6A. The CPU 1 executes the following operations according to the program stored in the ROM.

At first a step S1001 discriminates, by the recording flag, whether an image to be recorded is present in the DRAM 18. If the image to be recorded is present, a step S1002 discriminates whether the image to be recorded is stored by 8 lines. If not, the sequence waits until such storage is made, but, if stored, a step S1003 instructs the multi-functional gate array 26 to executes a horizontal-vertical conversion for rearranging the image data, which are arranged in the DRAM 18 in 8 lines in the main scanning direction of the reading sensor 12, into the sub scanning direction for supply to the print head.

In response to the instruction for the horizontal-vertical conversion, the multi-functional gate array 26 executes, in a step S1004, such horizontal-vertical conversion and stores thus converted image data in the DRAM 18. Then, in a step S1005, the recording flag for the image data of thus converted 8 lines is reset.

In the image forming apparatus of the present embodiment, the print head for color image recording is provided with 24 nozzles for each of Y, M and C colors, aligned in the sub scanning direction and arranged in the main scanning direction in the order of Y, M, C, and 64 nozzles for black color recording parallel to the Y, M, C nozzles. The color image recording becomes possible when the image data are stored by 24 nozzles for each of the Y, M, C and K colors. Consequently a step S1006 discriminates whether the image data are stored corresponding to 24 nozzles for each of Y, M, C and K colors. If not stored, the sequence returns to the step S1001 to await such data storage.

If the image data are stored corresponding to 24 nozzles, the CPU 1 drives, in a step S1007, the CR motor 29 and executes the color image recording of 24 nozzles according to thus stored image data. After such color image recording corresponding to 24 nozzles, the CPU drives, in a step S1008, the LF motor 27 to feed the recording sheet by a distance corresponding to 24 nozzles. Then a step S1009 discriminates whether the recording of all the data have been completed, and, if not, the sequence returns to the step S1001, but, if completed, the color recording task is terminated.

Figure 14:
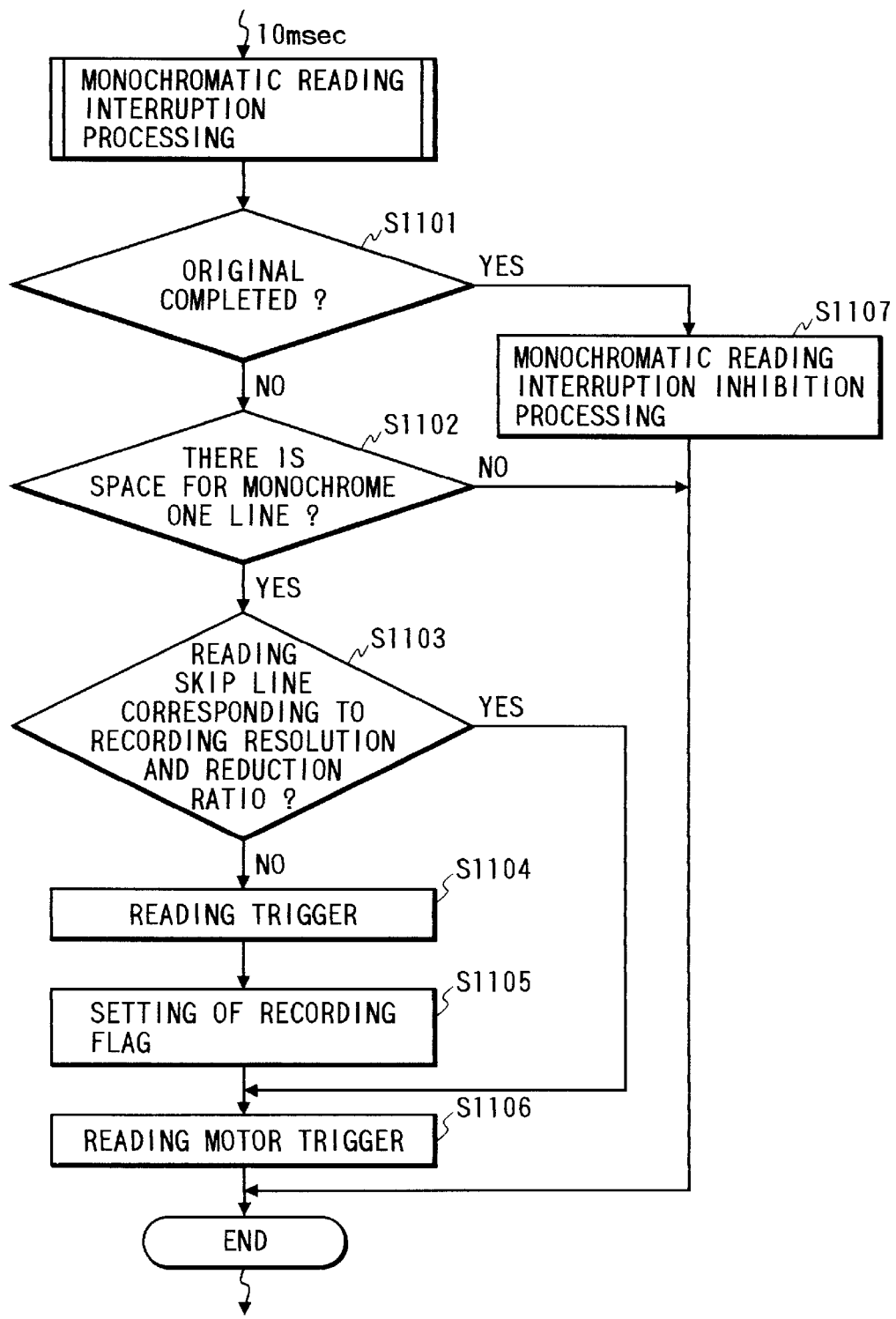
FIG. 14 is a flow chart of a monochromatic image reading process.

In the following there will be explained, with reference to FIG. 14, a monochromatic image reading process, which is executed, upon activation by the step S624 in FIG. 6B, as an interruption process at an interval of 10 msec.

When the monochromatic image reading process is activated by the step S624 in FIG. 6B, the CPU 1 at first discriminates, in a step S1101, whether the transportation of the original has been completed. If completed, the CPU 1 executes, in a step S1107, a process of inhibiting the present monochromatic image reading interruption process, whereby the present sequence is terminated. If the transportation of the original has not been completed, in a step S902, the CPU 1 discriminates whether the DRAM 18 has a vacancy of a line of the monochromatic image, and, if such vacancy is not available, the present monochromatic image reading interruption process is terminated.

If the vacancy of 1 line of the monochromatic image is available, the CPU 1 executes the conversion of resolution in the sub scanning direction. In the sub scanning direction, since the recording resolution (360 dpi) is coarser than the reading resolution (15.4 pel or ca. 400 dpi), it is necessary to skip about 10% of the read lines. Also in case of reducing the size of the original image according to the size of the recording sheet, the read lines have to be skipped according to the reduction ratio. For this purpose, in a step S1103, the CPU 1 discriminates whether the considered line is to be skipped without reading in order to match the recording resolution or the recording sheet size, based on the data set in the DRAM 18 in the step S623, and, if the considered line is identified not to be skipped, the CPU 1 issues a reading trigger in a step S1104.

In response to the reading trigger, the image processing gate array 16 reads the image by turning on the green LED light source with the lighting time determined in the above-explained pre-scan process. The green LED light source is used for the monochromatic image reading because it is closest to the white light source, and also because a separate white light source will inevitably increase the cost and the dimension of the image forming apparatus if it is intended to be inexpensive and compact for home use as in the present embodiment. The read image is subjected, in the image processing gate array 16, to the image processing such as shading correction and black correction.

Then the resolution conversion circuit 713 executes the conversion of resolution in the main scanning direction, on the image with the reading resolution of 8 pel (about 200 dpi) into the resolution of 360 dpi recordable with the print head, and the masking process for the area which is not recordable on the recording sheet or the image reduction process, in order to match the size of the recording sheet, based on the value set in the reduction ratio/mask area setting register 714.

FIG. 15 shows the image sizes to be recorded in various combinations of the original size and the recording sheet size, wherein B4-A4, for example, indicates a reduced recording of B4-sized original into A4 size. The image data after the conversion of resolution in the resolution conversion circuit 713 are sent to the output register 715 and stored in the DRAM 18. Upon storage of the image data in the DRAM 18, a step S1105 sets a recording flag in the work area of the DRAM 18. After the setting of the recording flag, a step S1106 issues a reading motor trigger to drive the reading motor, thereby feeding the original by a line, whereupon the monochromatic reading interruption process is terminated.

In case the CPU 1 identifies, in the step S1103, that the considered line is to be skipped without reading in order to match the recording resolution or the reduction ratio, the sequence proceeds to a step S1106 for issuing the reading motor trigger to drive the reading motor, thereby feeding the original by a line, whereupon the monochromatic reading task is terminated. This interruption process enables a reading operation with a speed of 10 msec per line. As the monochromatic image processing is simpler than the color image processing, a monochromatic copy can be obtained faster than in the case of color copying.

Figure 16:
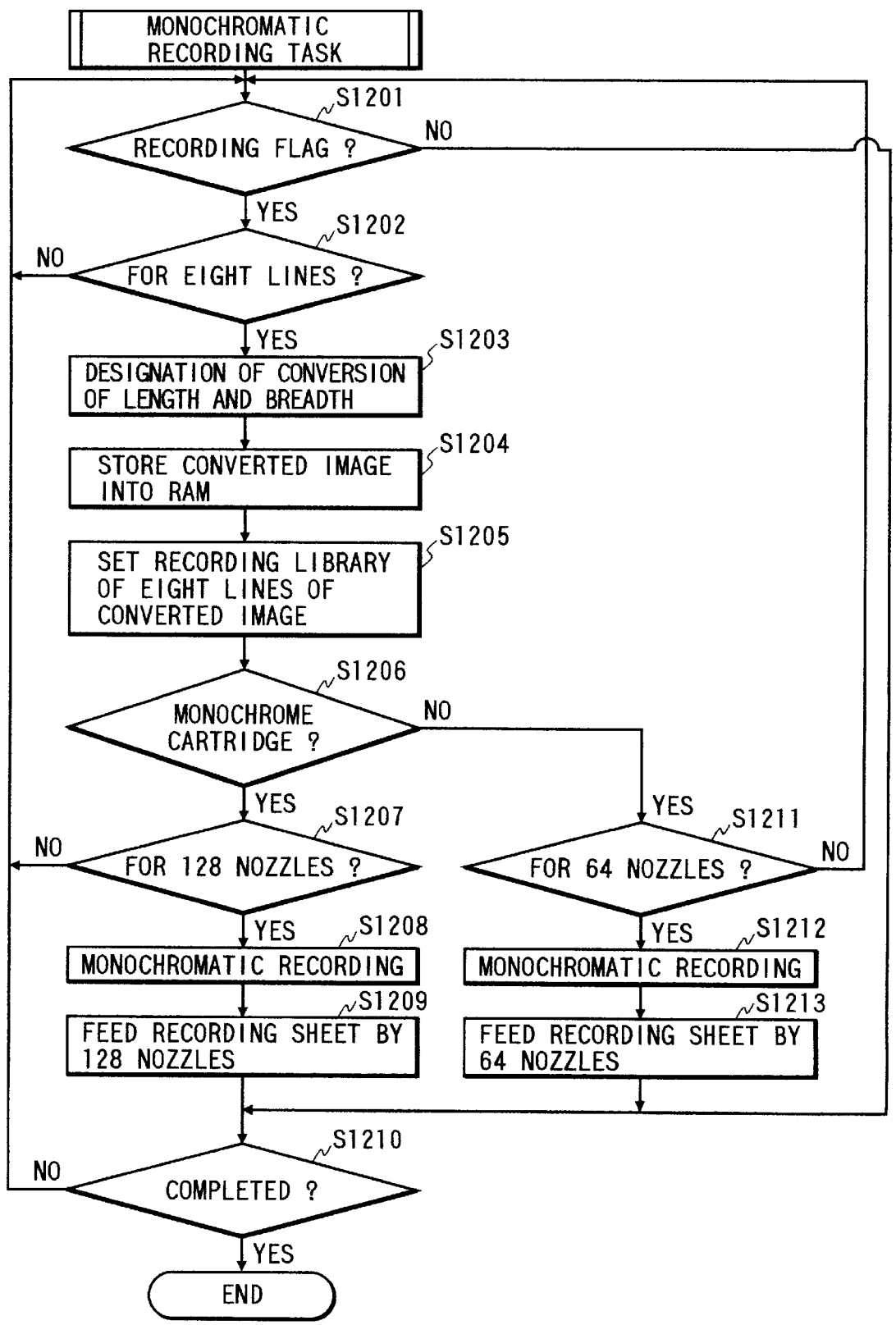
FIG. 16 is a flowchart of a monochromatic recording process.

In the following there will be explained, with reference to FIG. 16, a monochromatic recording task, which is activated by the step S625 in FIG. 6B. The CPU 1 executes the following operations according to the program stored in the ROM.

At first a step S1201 discriminates, by the recording flag, whether an image to be recorded is present in the DRAM 18. If the image to be recorded is present, a step S1202 discriminates whether the image to be recorded is stored by 8 lines. If not, the sequence waits until such storage is made, but, if stored, a step S1203 instructs the multi-functional gate array 26 to execute a horizontal-vertical conversion for rearranging the image data, which are arranged in the DRAM 18 in 8 lines in the main scanning direction of the reading sensor 12, into the sub scanning direction for supply to the print head.

In response to the instruction for the horizontal-vertical conversion, the multi-functional gate array 26 executes, in a step S1204, such horizontal-vertical conversion and stores thus converted image data in the DRAM 18. Then, in a step S1205, the recording flag for the image data of thus converted 8 lines is reset. In the image forming apparatus of the present embodiment, the monochromatic image recording can be achieved either by the color print head or by the monochromatic print head.

The color print head is provided with 24 nozzles for each of Y, M and C colors, aligned in the sub scanning direction and arranged in the main scanning direction in the order of Y, M, C, and 64 nozzles for black color recording parallel to the Y, M, C nozzles. The monochromatic image recording becomes possible when the K image data are stored corresponding to 64 nozzles. On the other hand, the monochromatic print head is provided with 128 nozzles arrayed in the sub scanning direction, and can execute the recording operation when the K image data are stored corresponding to 128 nozzles.

Since the monochromatic print head and the color print head are different in the timing of recording as explained above, the CPU 1 discriminates, in a step S1206, whether the mounted print head is the monochromatic print head or the color print head. In case the monochromatic print head is mounted, a step S1207 discriminates whether the image data are stored corresponding to 128 nozzles, and, if not stored, the sequence returns to the step S1201 to await the storage of such data.

If the image data are stored corresponding to 128 nozzles, the CPU 1 drives, in a step S1208, the CR motor 29 and executes the monochromatic image recording of 128 nozzles according to thus stored image data. After such monochromatic image recording of 128 nozzles, the CPU drives, in a step S1209, the LF motor 27 to feed the recording sheet by a distance corresponding to 128 nozzles.

In case the color print head is mounted, a step S1211 discriminates whether the image data are stored corresponding to 64 nozzles, and, if not stored, the sequence returns to the step S1201 to await the storage of such data. If the image data are stored corresponding to 64 nozzles, the CPU 1 drives, in a step S1212, the CR motor 29 and executes the monochromatic image recording of 64 nozzles according to thus stored image data. After such monochromatic image recording of 64 nozzles, the CPU drives, in a step S1213, the LF motor 27 to feed the recording sheet by a distance corresponding to 64 nozzles. Then a step S1210 discriminates whether the recording of all the data have been completed, and, if not, the sequence returns to the step S1201, but, if completed, the monochromatic recording task is terminated.

Figure 17:
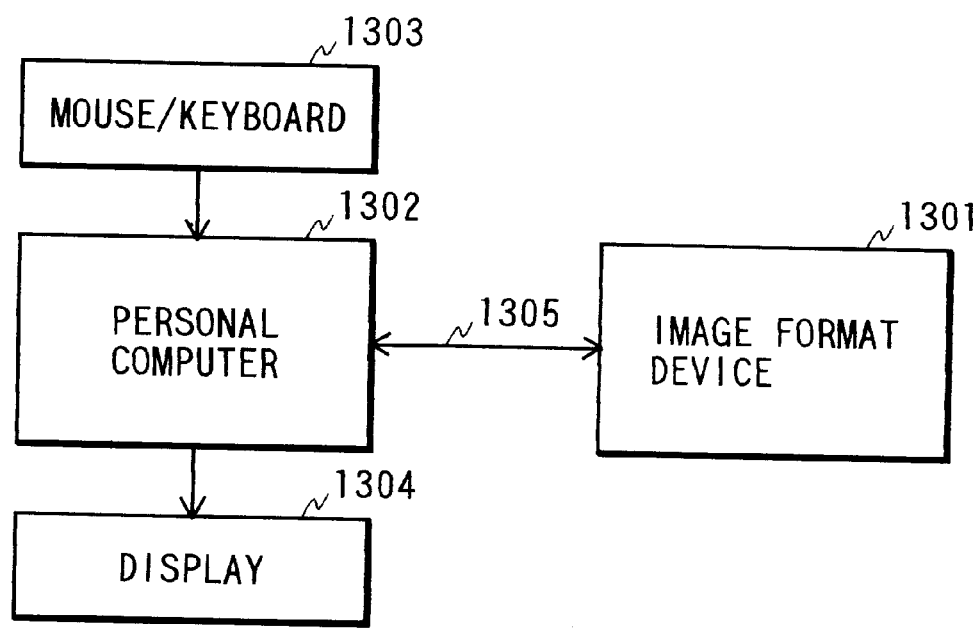
FIG. 17 is a view showing the configuration of a system formed by connecting the image forming apparatus to a personal computer.

FIG. 17 shows a systemized configuration constituting a second embodiment, formed by connecting an image forming apparatus to a personal computer.

There are provided an image forming apparatus 1301 as explained in the foregoing; a personal computer 1302; a display 1304 for displaying the work executed on the personal computer 1302; a mouse/keyboard 1303 for entering commands etc. into the personal computer; and an interface 1305 for exchanging data, commands, status information etc. between the personal computer and the image forming apparatus.

The personal computer 1302 allows the entry of a color/monochromatic copying instruction from the mouse/keyboard 1303 into the image forming apparatus. More specifically, in response to a color/monochromatic copying instruction entered from the mouse/keyboard 1303, a color/monochromatic copy command is entered into the image forming apparatus through the interface 1305.

The CPU 1 in the image forming apparatus 1302 is so constructed as to function, in response to the color or monochromatic copy command from the personal computer, in the same manner as in response to the depression of the color copy key (S602) or of the monochromatic copy key (S601) shown in FIG. 6A. It also transfers the status information in the steps S603, S604, S605, S606, S617, S618 and S619 to the personal computer 1302 through the interface 1305.

In response to such status information, the personal computer 1302 may display information, similar to those of the steps S613, S614, S615, S626, S627 and S628, on the display 1304 according to a program stored in the personal computer. In this manner the operator of the personal computer, even if not located at the image forming apparatus of the present invention, can understand the reason for non-execution of copying and can take immediate action. In the foregoing description, the image reading unit and the recording unit are assumed to be constructed integrally, but they may also be formed as separate units.

The configuration explained in the foregoing allows to provide an image forming apparatus capable of avoiding wasted lighting of the light sources, extending the lifetime thereof and reducing the electric power consumption. Also image reading of high quality can be achieved in each of monochromatic and color images, as the lighting times of the light sources can be selected according to the image reading mode.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image forming apparatus comprising:
   a) plural light sources emitting lights of respectively different wavelengths;
   b) reading means for reading an image illuminated with said light sources;
   c) mode switching means for selecting either a first mode for reading said image in a single color by said reading means or a second mode for reading said image in plural colors;
   d) light emitting time setting means for setting the light emitting time of said light sources;
   e) electric power setting means for setting the amounts of the electric power supplied to said light sources; and
   f) control means for causing said light emitting time setting means to set the light emitting time of said first mode to be different from that of said second mode and causing said electric power setting means to set the amounts of the electric power supplied in said first mode to be different from that supplied in said second mode.

2. An apparatus according to claim 1, wherein said control means is adapted to control said light emitting time setting means in such a manner that the light emitting time in said first mode becomes longer than that in said second mode.

3. An apparatus according to claim 2, wherein, when said first mode is selected by said mode switching means, said control means is adapted to turn on one of said plural light sources.

4. An apparatus according to claim 3, wherein, when said second mode is selected by said mode switching means, said control means is adapted to turn on said plural light sources in succession.

5. An apparatus according to claim 4, wherein said plural light sources include red, green and blue light sources.

6. An apparatus according to claim 3, wherein, when said first mode is selected by said mode switching means, said control means is adapted to turn on the green light source.

7. An apparatus according to claim 2, wherein said control means is adapted to control said power setting means in such a manner that the electric power supply amount in said first mode becomes smaller than that in said second mode.

8. An apparatus according to claim 7, wherein, when said first mode is selected by said mode switching means, said control means is adapted to turn on one of said plural light sources.

9. An apparatus according to claim 8, wherein, when said second mode is selected by said mode switching means, said control means is adapted to turn on said plural light sources in succession.

10. An apparatus according to claim 9, wherein said plural light sources include red, green and blue light sources.

11. An apparatus according to claim 8, wherein, when said first mode is selected by said mode switching means, said control means is adapted to turn on the green light source.

12. An apparatus according to claim 1, wherein said control means is adapted to control said power setting means in such a manner that the electric power supply amount in said first mode becomes smaller than that in said second mode.

13. An apparatus according to claim 12, wherein, when said first mode is selected by said mode switching means, said control means is adapted to turn on one of said plural light sources.

14. An apparatus according to claim 13, wherein, when said second mode is selected by said mode switching means, said control means is adapted to turn on said plural light sources in succession.

15. An apparatus according to claim 14, wherein said plural light sources include red, green and blue light sources.

16. An apparatus according to claim 13, wherein, when said first mode is selected by said mode switching means, said control means is adapted to turn on the green light source.

17. An apparatus according to claim 1, wherein, when said first mode is selected by said mode switching means, said control means is adapted to turn on one of said plural light sources.

18. An apparatus according to claim 17, wherein, when said second mode is selected by said mode switching means, said control means is adapted to turn on said plural light sources in succession.

19. An apparatus according to claim 18, wherein said plural light sources include red, green and blue light sources.

20. An apparatus according to claim 17, wherein, when said first mode is selected by said mode switching means, said control means is adapted to turn on the green light source.

21. An apparatus according to claim 1, wherein said plural light sources include LEDS.

22. An image forming method comprising:
   a reading step of reading an image illuminated with plural light sources emitting lights of respectively different wavelengths;
   a mode switching step of selecting either a first mode for reading said image in a single color by said reading step or a second mode for reading said image in plural colors;
   a light emitting time setting step of setting the light emitting time of said light sources;
   an electric power setting step of setting the amounts of the electric power supplied to said light sources; and
   a control step of causing said light emitting time setting step to set the light emitting time of said first mode to be different from that of said second mode and causing said electric power supplied setting step to set the amounts of the electric power supplied in said first mode to be different from that supplied in said second mode.

23. A method according to claim 22, wherein said control step is adapted to control said light emitting time setting step in such a manner that the light emitting time in said first mode becomes longer than that in said second mode.

24. A method according to claim 23, wherein, when said first mode is selected by said mode switching step, said control step is adapted to turn on one of said plural light sources.

25. A method according to claim 24, wherein, when said second mode is selected by said mode switching step, said control step is adapted to turn on said plural light sources in succession.

26. A method according to claim 25, wherein said plural light sources include red, green and blue light sources.

27. A method according to claim 24, wherein, when said first mode is selected by said mode switching step, said control step is adapted to turn on the green light source.

28. A method according to claim 23, wherein said control step is adapted to control said power setting step in such a manner that the electric power supply amount in said first mode becomes smaller than that in said second mode.

29. A method according to claim 28, wherein, when said first mode is selected by said mode switching step, said control step is adapted to turn on one of said plural light sources.

30. A method according to claim 29, wherein, when said second mode is selected by said mode switching step, said control step is adapted to turn on said plural light sources in succession.

31. A method according to claim 30, wherein said plural light sources include red, green and blue light sources.

32. A method according to claim 29, wherein, when said first mode is selected by said mode switching step, said control step is adapted to turn on the green light source.

33. A method according to claim 22, wherein said control step is adapted to control said power setting step in such a manner that the electric power supply amount in said first mode becomes smaller than that in said second mode.

34. A method according to claim 33, wherein, when said first mode is selected by said mode switching step, said control step is adapted to turn on one of said plural light sources.

35. A method according to claim 34, wherein, when said second mode is selected by said mode switching step, said control step is adapted to turn on said plural light sources in succession.

36. A method according to claim 35, wherein said plural light sources include red, green and blue light sources.

37. A method according to claim 34, wherein, when said first mode is selected by said mode switching step, said control step is adapted to turn on the green light source.

38. A method according to claim 22, wherein, when said first mode is selected by said mode switching step, said control step is adapted to turn on one of said plural light sources.

39. A method according to claim 38, wherein, when second mode is selected by said mode switching step, said control step is adapted to turn on said plural light sources in succession.

40. A method according to claim 39, wherein said plural light sources include red, green and blue light sources.

41. A method according to claim 38, wherein, when said first mode is selected by said mode switching step, said control step is adapted to turn on the green light source.

42. A method according to claim 22, wherein said plural light sources include LEDs.

43. A recording medium for computer-readably recording a program for executing an image forming method, said image forming method comprising:

a reading step of reading an image illuminated with plural light sources emitting lights of respectively different wavelengths;

a mode switching step of selecting either a first mode for reading said image in a single color by said reading step or a second mode for reading said image in plural colors;

a light emitting time setting step of setting the light emitting time of said light sources;

an electric power setting step of setting the amounts of the electric power supplied to said light sources; and a control step of causing said light emitting time setting step to set the light emitting time of said first mode to be different from that of said second mode and causing said electric power setting step to set the amounts of the electric power supplied in said first mode to be different from that supplied in said second mode.

44. A medium according to claim 43, wherein said control step is adapted to control said light emitting time setting step in such a manner that the light emitting time in said first mode becomes longer than that in said second mode.

45. A medium according to claim 44, wherein, when said first mode is selected by said mode switching means, said control means is adapted to turn on one of said plural light sources.

46. A medium according to claim 45, wherein, when said second mode is selected by said mode switching step, said control step is adapted to turn on said plural light sources in succession.

47. A medium according to claim 46, wherein said plural light sources include red, green and blue light sources.

48. A medium according to claim 45, wherein, when said first mode is selected by said mode switching step, said control step is adapted to turn on the green light source.

49. A medium according to claim 44, wherein said control step is adapted to control said power setting step in such a manner that the electric power supply mount in said first mode becomes smaller than that in said second mode.

50. A medium according to claim 49, wherein, when said first mode is selected by said mode switching step, said control step is adapted to turn on one of said plural light sources.

51. A medium according to claim 50, wherein, when said second mode is selected by said mode switching step, said control step is adapted to turn on said plural light sources in succession.

52. A medium according to claim 51, wherein said plural light sources include, red, green and blue light sources.

53. A medium according to claim 50, wherein, when said first mode is selected by said mode switching step, said control step is adapted to turn on the green light source.

54. A medium according to claim 43, wherein said control step is adapted to control said power setting step in such a manner that the electric power supply amount in said first mode becomes smaller than that in said second mode.

55. A medium according to claim 54, wherein, when said first mode is selected by said mode switching step, said control step is adapted to turn on one of said plural light sources.

56. A medium according to claim 55, wherein, when said second mode is selected by said mode switching step, said control step is adapted to turn on said plural light sources in succession.

57. A medium according to claim 56, wherein said plural light sources include red, green and blue light sources.

58. A medium according to claim 55, wherein, when said first mode is selected by said mode switching step, said control step is adapted to turn on the green light source.

59. A medium according to claim 43, wherein, when said first mode is selected by said mode switching step, said control step is adapted to turn on one of said plural light sources.

60. A medium according to claim 59, wherein, when said second mode is selected by said mode switching step, said control step is adapted to turn on said plural light sources in succession.

61. A medium according to claim 60, wherein said plural light sources include red, green and blue light sources.

62. A medium according to claim 59, wherein, when said first mode is selected by said mode switching step, said control step is adapted to turn on the green light source.

63. A medium according to claim 43, wherein said plural light sources include LEDs.

* * * * *

UNITED STATES PATENT AND TRADEMARK OFFICE
CERTIFICATE OF CORRECTION

PATENT NO.   : 6,084,692
DATED        : July 4, 2000
INVENTOR(S)  : Atsushi Ohtani et al.

It is certified that error appears in the above-identified patent and that said Letters Patent is hereby corrected as shown below:

Column 1,
Line 65, "eliminated" should read -- eliminate --.

Column 2,
Line 22, "6 comprising" should read -- 6, comprised --.

Column 3,
Line 49, "shown are a" should read -- shown a --.

Column 8,
Line 3, "conversion of the" should be deleted.

Column 10,
Line 17, "twice of" should read -- the same --.

Column 11,
Line 3, "same" should read -- the same --;
Line 12, "3XSH" should read -- 1XSH -- .

Column 13,
Line 43, "executes" should read -- execute --.

UNITED STATES PATENT AND TRADEMARK OFFICE
CERTIFICATE OF CORRECTION

PATENT NO.   : 6,084,692
DATED        : July 4, 2000
INVENTOR(S)  : Atsushi Ohtani et al.

It is certified that error appears in the above-identified patent and that said Letters Patent is hereby corrected as shown below:

Column 14,
Line 28, "1 line" should read -- one line --.

Column 15,
Line 30, "by 8" should read -- by eight --;
Line 35, "in 8" should read -- in eight --;
Line 43, "8 lines" should read -- eight lines --.

Column 20,
Line 31, "include," should read -- include --.

Signed and Sealed this

Fourth Day of September, 2001

*Attest:*

*Attesting Officer*

NICHOLAS P. GODICI
*Acting Director of the United States Patent and Trademark Office*